(12) United States Patent
Imaizumi et al.

(10) Patent No.: US 7,406,036 B2
(45) Date of Patent: Jul. 29, 2008

(54) RADIO COMMUNICATION APPARATUS, BASE STATION APPARATUS, COMMUNICATION TERMINAL APPARATUS AND TRANSMISSION RATE PREDICTING METHOD

(75) Inventors: Satoshi Imaizumi, Yokosuka (JP); Kazuyuki Miya, Setagaya-ku (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 233 days.

(21) Appl. No.: 10/547,764

(22) PCT Filed: Nov. 14, 2004

(86) PCT No.: PCT/JP2004/017095

§ 371 (c)(1),
(2), (4) Date: Sep. 2, 2005

(87) PCT Pub. No.: WO2005/050943

PCT Pub. Date: Jun. 2, 2005

(65) Prior Publication Data

US 2006/0291377 A1    Dec. 28, 2006

(30) Foreign Application Priority Data

Nov. 20, 2003   (JP)   .............................. 2003-390767

(51) Int. Cl.
*H04J 3/14* (2006.01)

(52) U.S. Cl. .................. 370/218; 370/436; 370/252; 370/331; 370/391; 455/423; 455/452.1; 455/461; 455/426.1; 455/69

(58) Field of Classification Search .................. 370/218, 370/436, 252; 455/423, 426.1, 461
See application file for complete search history.

(56) References Cited

U.S. PATENT DOCUMENTS 5,594,729 A * 1/1997 Kanakia et al. ............. 370/391

(Continued)

FOREIGN PATENT DOCUMENTS

JP        9219697          8/1997

(Continued)

OTHER PUBLICATIONS

Informal Comments submitted to PCT Operations Division on Mar. 16, 2006 with English translation.

(Continued)

*Primary Examiner*—David Q. Ngyuen
(74) *Attorney, Agent, or Firm*—Stevens, Davis, Miller & Mosher, LLP

(57) ABSTRACT

A radio communication apparatus, base station apparatus and communication terminal apparatus capable of predicting an accurate transmission rate before starting data communications to know download time and the like. In the apparatus, a packet CH demodulation section (103) demodulates received packet data. A pilot CH demodulation section (104) demodulates a received signal of a pilot channel. A reception state measuring section (105) measures the SIR from the received signal of the pilot channel. A transmission rate candidate selecting section (106) stores a calculation expression that associates CQI with SIR, and selects CQI by the calculation expression using the measured SIR. A transmission rate predicting section (108) averages selected CQI for a predetermined time to output a transmission rate prediction value. A transmission rate prediction control section (110) outputs information of the transmission rate prediction value to a display section (111) when detecting a key input. The display section (111) displays the transmission rate prediction value on a liquid crystal screen.

10 Claims, 17 Drawing Sheets

U.S. PATENT DOCUMENTS

| | | | |
|---|---|---|---|
| 5,812,938 A * | 9/1998 | Gilhousen et al. | 455/69 |
| 6,157,845 A * | 12/2000 | Henry et al. | 455/426.1 |
| 6,205,129 B1 * | 3/2001 | Esteves et al. | 370/331 |
| 6,597,894 B1 * | 7/2003 | Ue et al. | 455/69 |
| 6,760,311 B1 * | 7/2004 | Raith | 370/252 |
| 6,889,041 B2 * | 5/2005 | Miyoshi et al. | 455/423 |
| 6,931,320 B2 * | 8/2005 | Mori et al. | 701/212 |
| 2001/0017851 A1 * | 8/2001 | Yamaguchi et al. | 370/332 |
| 2002/0068588 A1 * | 6/2002 | Yoshida et al. | 455/461 |
| 2002/0137519 A1 * | 9/2002 | Miyoshi et al. | 455/452 |
| 2003/0103520 A1 * | 6/2003 | Chen et al. | 370/444 |
| 2003/0165126 A1 | 9/2003 | Sugita | |
| 2003/0171094 A1 | 9/2003 | Kawal | |

FOREIGN PATENT DOCUMENTS

| | | |
|---|---|---|
| JP | 2000031884 | 1/2000 |
| JP | 2001111630 | 4/2001 |
| JP | 2002044036 | 2/2002 |
| JP | 2002353876 | 12/2002 |
| JP | 2003209537 | 7/2003 |
| JP | 2003268706 | 9/2003 |

OTHER PUBLICATIONS

PCT International Search Report dated Jan. 11, 2004.
Japanese Office Action dated May 1, 2007 with English translation.

* cited by examiner

| CQI | TBS+CRC | THE NUMBER OF CODES | MODULATION SCHEME | CODING RATE |
|---|---|---|---|---|
| 0 | N/A | OOR | | |
| 1 | 160 | 1 | QPSK | 0.17 |
| 2 | 200 | 1 | QPSK | 0.21 |
| 3 | 260 | 1 | QPSK | 0.27 |
| 4 | 340 | 1 | QPSK | 0.35 |
| 5 | 400 | 1 | QPSK | 0.42 |
| 6 | 480 | 1 | QPSK | 0.50 |
| 7 | 680 | 2 | QPSK | 0.35 |
| 8 | 820 | 2 | QPSK | 0.43 |
| 9 | 960 | 2 | QPSK | 0.50 |
| 10 | 1290 | 3 | QPSK | 0.45 |
| 11 | 1520 | 3 | QPSK | 0.53 |
| 12 | 1780 | 3 | QPSK | 0.62 |
| 13 | 2300 | 4 | QPSK | 0.60 |
| 14 | 2610 | 4 | QPSK | 0.68 |
| 15 | 3330 | 5 | QPSK | 0.69 |
| 16 | 3590 | 5 | 16-QAM | 0.37 |
| 17 | 4200 | 5 | 16-QAM | 0.44 |
| 18 | 4700 | 5 | 16-QAM | 0.49 |
| 19 | 5300 | 5 | 16-QAM | 0.55 |
| 20 | 5910 | 5 | 16-QAM | 0.62 |
| 21 | 6600 | 5 | 16-QAM | 0.69 |
| 22 | 7200 | 5 | 16-QAM | 0.75 |
| 23 | 9750 | 7 | 16-QAM | 0.73 |
| 24 | 11500 | 8 | 16-QAM | 0.75 |
| 25 | 14400 | 10 | 16-QAM | 0.75 |
| 26 | 17300 | 12 | 16-QAM | 0.75 |
| 27 | 21600 | 15 | 16-QAM | 0.75 |
| 28 | 23300 | 15 | 16-QAM | 0.81 |
| 29 | 24300 | 15 | 16-QAM | 0.84 |
| 30 | 25500 | 15 | 16-QAM | 0.89 |
| 31 | RSVD | | | |

RADIO COMMUNICATION APPARATUS, BASE STATION APPARATUS, COMMUNICATION TERMINAL APPARATUS AND TRANSMISSION RATE PREDICTING METHOD

TECHNICAL FIELD

The present invention relates to a radio communication apparatus, base station apparatus, communication terminal apparatus and transmission rate predicting method, and more particularly, to a radio communication apparatus, base station apparatus, communication terminal apparatus and transmission rate predicting method to perform high-speed packet communications in HSDPA, for example.

BACKGROUND ART

Conventionally, as means for a user to recognize a reception state of a terminal before starting data communications, there has been a method for displaying the reception state on a screen of the terminal using antenna marks. In this method, the state is represented by varying the number of antennas corresponding to the reception level on a pilot channel, for example (e.g. Patent Document 1). When the number of antenna marks is a few which is displayed on the screen of the terminal, the user is capable of having an assumption that the reception state is poor, and it is thus difficult to receive data of a high transmission rate. Meanwhile, when the number of antenna marks is large which is displayed on the screen of the terminal, the user is capable of having an assumption that the reception state is good, and it is thus possible to receive data of a high transmission rate. In this way, according to the number of antenna marks, the user is capable of indirectly recognizing the transmission rate and quality of service allowed by the transmission rate.

Meanwhile, there is known an HSDPA (High Speed Downlink Packet Access) system, as a mobile communication system using a communication scheme of switching between transmission rates corresponding to reception quality of a terminal after starting data communications. In HSDPA, a terminal measures the reception quality, and notifies a base station of a transmission rate enabling reception in the terminal based on the measured reception quality. The terminal in HSDPA measures as reception quality a signal to noise ratio in pilot channel signal that is a signal always transmitted from the base station, selects receivable transmission rate candidates using information of the measured reception quality, and transmits information of the selected transmission rate to the base station. The base station receives the information of the transmission rate from a plurality of terminals, selects a modulation scheme suitable for packet data to transmit to a terminal in good reception state to modulate the data, while performing processing called scheduling, and then, transmits the packet data to the terminal.

As a service to provide to a user using the transmission rate measured after starting data communications, such a service is known that indicates download prediction time in best-effort type service such as the Internet. The download prediction time is obtained by periodically monitoring the transmission rate of a short interval after actually starting the download, and dividing a remaining data amount by throughput.

Patent Document 1

Japanese Laid-Open Patent Publication 2002-44036

Disclosure of Invention

Problems to be Solved by the Invention

However, in the conventional apparatus, there are problems that it is only possible to estimate a transmission rate indirectly by the number of antenna marks before starting data communications, the antenna mark is only aimed to represent radio signal intensity, and does not indicate an accurate transmission rate always, and therefore, the user cannot obtain accurate transmission rate information. Accordingly, for example, when a user starts download of data taking into account a transmission rate estimated from the number of antenna marks, a case arises that the download time becomes longer than expectations of the user. Further, since the user can recognize the time required for download only after starting the download, processing for halting the download and the like is required when the user cannot wait until the time the download is finished, resulting in inconvenience and poor operability. In the conventional radio communication apparatus and transmission rate predicting method, it is necessary to cause a transmission rate to respond to rapid fading variations with accuracy, the transmission rate measured during data communications in HSDPA thereby varies frequently, and a problem occurs that it is not possible to obtain an accurate transmission rate prediction value when using a transmission rate measured during communications without any processing, as a prediction value of transmission rate for a next communication.

It is an object of the present invention to provide a radio communication apparatus and transmission rate predicting method enabling prediction of an accurate transmission rate before starting data communications to know download time and the like.

Means for Solving the Problem

A radio communication apparatus of the present invention adopts a configuration provided with a reception quality measurer that calculates a measurement value indicative of reception quality from a reception quality measurement signal received before starting communications of packet data, a transmission rate selector that selects a transmission rate of the packet data based on the measurement value measured in the reception quality measurer, and a transmission rate predictor that obtains a transmission rate prediction value from an average transmission rate obtained by averaging the transmission rate selected in the transmission rate selector for a predetermined time.

A base station apparatus of the invention adopts a configuration provided with a transmission rate prediction value information extractor that extracts from a received signal transmission rate prediction value information that is information of a transmission rate prediction value of a communication terminal apparatus before starting communications of packet data, a reception quality extractor that obtains from the received signal a measurement value indicative of reception quality in each communication terminal apparatus before starting communications of packet data while obtaining the measurement value in each communication terminal apparatus that is communicating packet data, a terminal assignment simulator that obtains an assignment frequency of each communication terminal apparatus before starting communications of packet data and an assignment frequency of each communication terminal apparatus that is communicating packet data so as to fall within predetermined resources from the measurement value obtained in the reception quality measurer and the transmission rate prediction value information, a transmission rate prediction value information calculator that corrects the transmission rate prediction value information based on the assignment frequency obtained in the terminal assignment simulator and the transmission rate prediction value information, and a transmitter that transmits the transmission rate prediction value information corrected in the transmission rate prediction value information calculator to the communication terminal apparatus before starting communications of packet data.

A transmission rate predicting method of the invention has the steps of calculating a measurement value indicative of reception quality from a reception quality measurement signal received before starting communications of packet data, selecting a transmission rate of the packet data based on the measurement value, and obtaining a transmission rate prediction value from an average transmission rate obtained by averaging the selected transmission rate for a predetermined time.

Advantageous Effect of the Invention

According to the present invention, it is possible to predict an accurate transmission rate before starting data communications and to recognize download time and the like.

BRIEF DESCRIPTION OF DRAWINGS

FIG. 12 is a table showing relationships between CQI, modulation scheme and others according to Embodiment 5 of the invention;

BEST MODE FOR CARRYING OUT THE INVENTION

Embodiments of the invention will specifically be described below with reference to drawings.

Embodiment 1

Figure 1:
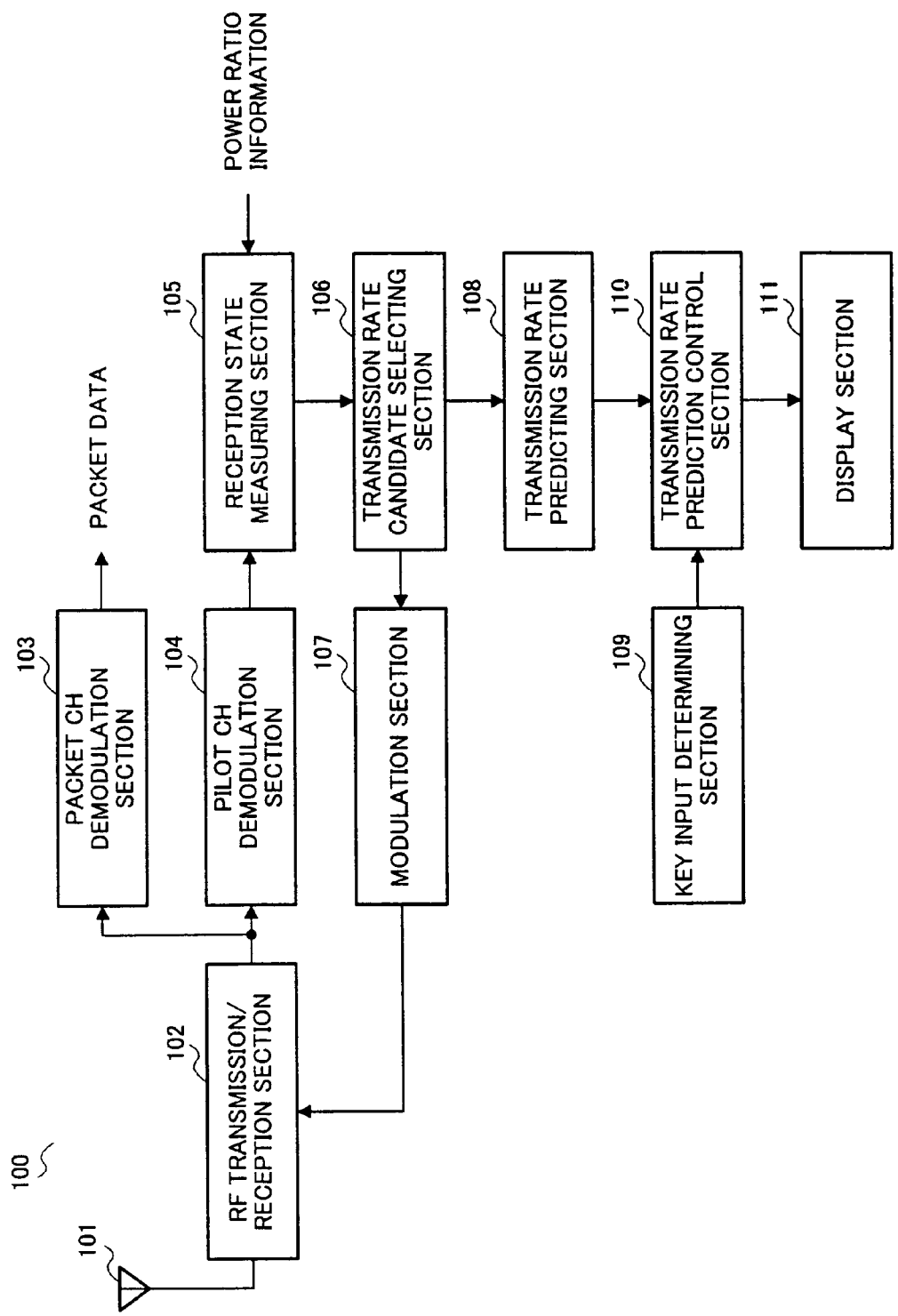
FIG. 1 is a block diagram illustrating a configuration of a radio communication apparatus according to Embodiment 1 of the present invention.

FIG. 1 is a block diagram illustrating a configuration of radio communication apparatus 100 according to Embodiment 1 of the invention.

RF transmission/reception section 102 performs processing for downconverting a received signal received in antenna 101 from a radio frequency to a baseband frequency and the like, and outputs the resultant to packet CH demodulation section 103 and pilot CH demodulation section 104, while performing processing for upconverting a transmission signal including information of transmission rate candidate input from modulation section 107 from a baseband frequency to a radio frequency and the like, and transmitting the radio signal from antenna 101.

Packet CH demodulation section 103 demodulates the received signal input from RF transmission/reception section 102 to obtain packet data of the packet channel.

Pilot CH demodulation section 104 demodulates a pilot signal that is a reception quality measurement signal input from RF transmission/reception section 102 to output to reception state measuring section 105.

Reception state measuring section 105 that is the reception quality measurer measures an SIR (Signal to Interference Ratio) that is a value indicative of the reception state using the pilot signal input from pilot CH demodulation section 104 to output to transmission rate candidate selecting section 106. Since the SIR obtained from the pilot signal indicates the reception quality of the pilot channel, reception state measuring section 105 obtains a factor to obtain reception quality of a packet transmission channel from the reception quality of the pilot channel using power ratio information that is information of a power ratio between the pilot channel and packet transmission channel that is beforehand notified from a communicating party to radio communication apparatus 100 before measuring the reception state, multiplies the SIR measurement value input from pilot CH demodulation section 104 by the factor, and thereby obtains the SIR on the packet transmission channel.

Figure 2:
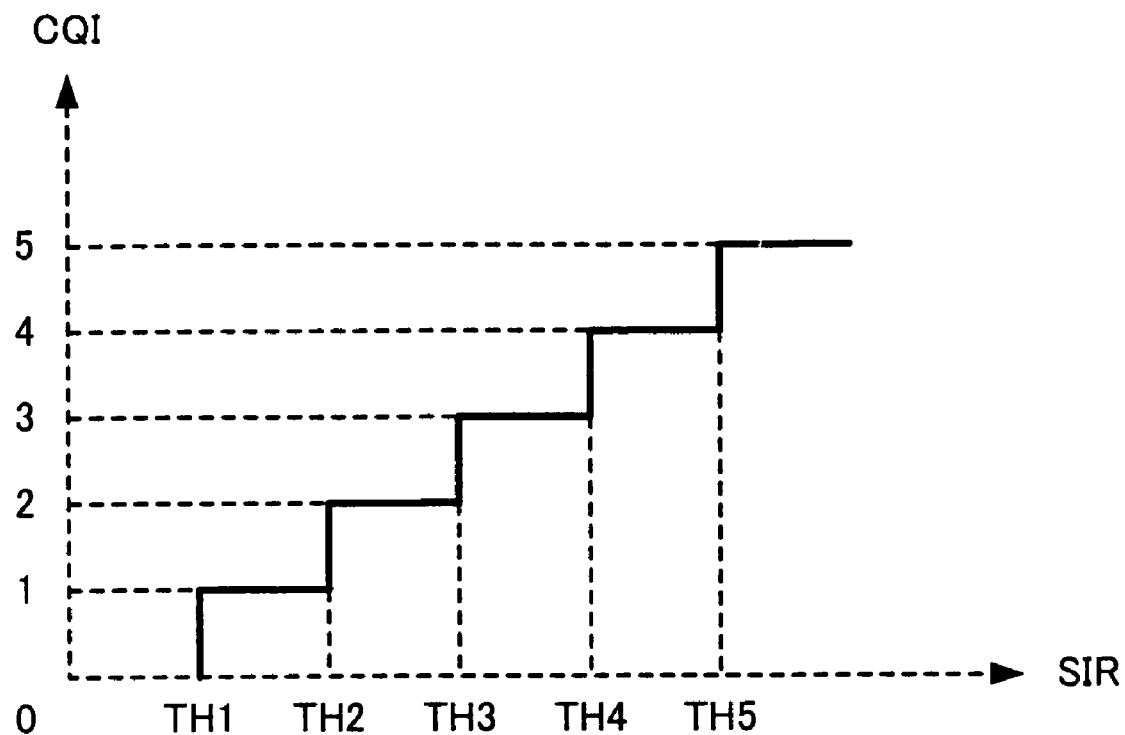
FIG. 2 is a graph illustrating a relationship between CQI and SIR according to Embodiment 1 of the invention.

Transmission rate candidate selecting section 106 that is the transmission rate selector stores a calculation expression that associates the SIR with CQI indicative of a transmission rate as shown in FIG. 2. In other words, as shown in FIG. 2, transmission rate candidate selecting section 106 stores the calculation expression such that CQI=0 is selected when the SIR is zero or more and less than TH1 (TH1>0), CQI=1 is selected when the SIR is TH1 or more and less than TH2 (TH2>TH1), CQI=2 is selected when the SIR is TH2 or more and less than TH3 (TH3>TH2), CQI=3 is selected when the SIR is TH3 or more and less than TH4 (TH4>TH3), CQI=4 is selected when the SIR is TH4 or more and less than TH5 (TH5>TH4), and that CQI=5 is selected when the SIR is TH5 or more. The CQI increases its level from 1 to 5 gradually, and indicates better reception quality as the level increases from 1 to 5 gradually. A corresponding packet transmission rate is defined for each CQI level, and the CQI serves as a recommendation value of packet transmission rate of a communicating party. Generally, the communicating party determines a transmission rate of packet with reference to the CQI level. Transmission rate candidate selecting section 106 selects CQI as a transmission rate by calculation with the stored calculation expression using the measurement value of SIR input from reception state measuring section 105. Then, transmission rate candidate selecting section 106 outputs the CQI that is the selected transmission rate of packet data to transmission rate predicting section 108 and modulation section 107. In addition, the CQI is not limited to five types, and it is possible to use arbitrary types of CQI other than the five types.

After starting communications of packet data, modulation section 107 modulates a transmission signal including the CQI input from transmission rate candidate selecting section 106 to output to RF transmission/reception section 102.

Transmission rate predicting section 108 processes the CQI input from transmission rate candidate selecting section 106 using a threshold, averages the resultant to obtain an average CQI that is an average transmission rate, and outputs the obtained average CQI to transmission rate prediction control section 110 as a transmission rate prediction value for use in starting packet data communications. Transmission rate predicting section 108 will specifically be described later.

Key input determining section 109 detects whether a key is input or not, and when detecting an input of the key, outputs a signal indicating that the key is input to transmission rate prediction control section 110.

When receiving the signal indicating that the key is input from key input determining section 109, transmission rate prediction control section 110 converts information of the transmission rate prediction value into data easily understandable expression to a user and outputs the data to display section 111, or outputs the information of the transmission rate prediction value input from transmission rate predicting section 108 to display section 111 without any processing.

Display section 111 displays the information of the transmission rate prediction value input from transmission rate prediction control section 110 on a display such as a liquid crystal screen.

Figure 3:
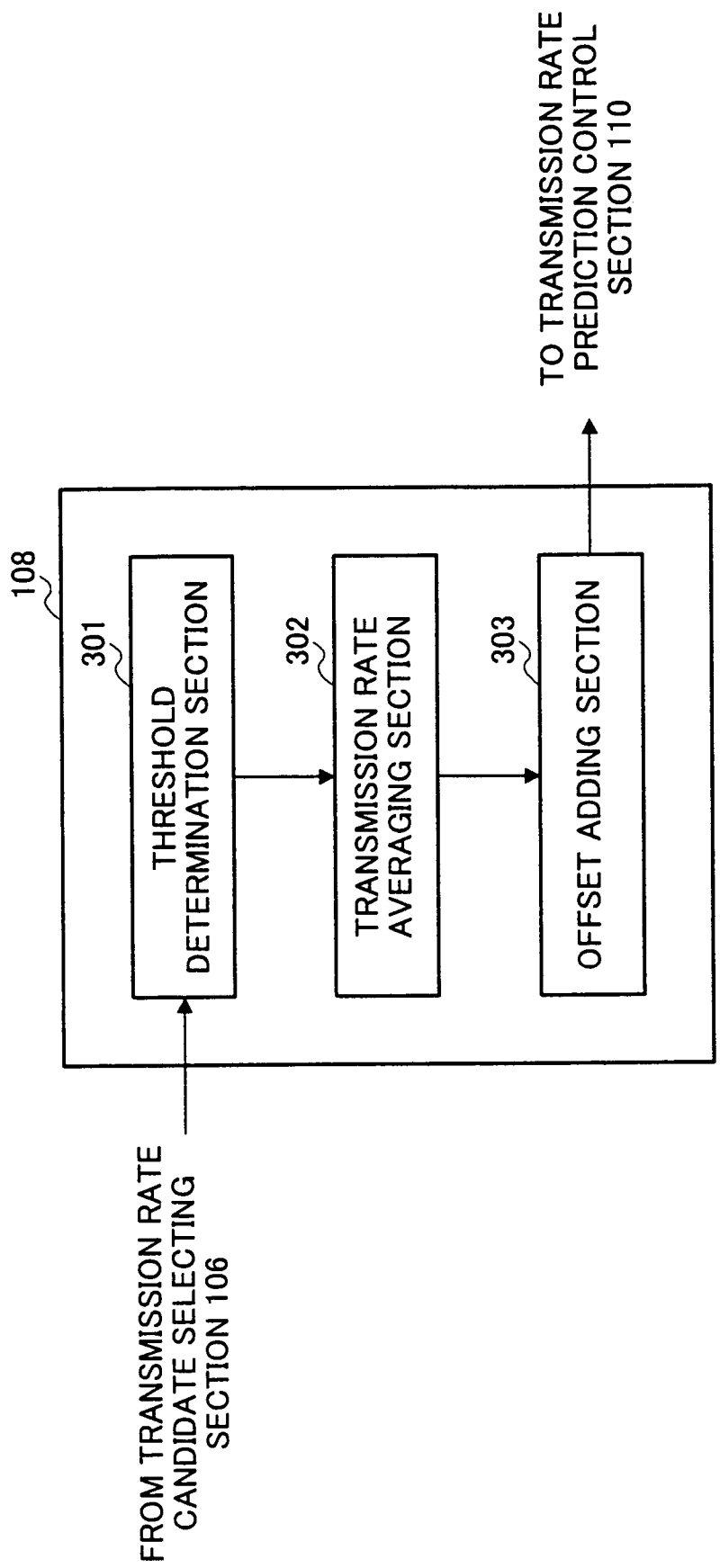
FIG. 3 is a block diagram illustrating a configuration of a transmission rate predicting section according to Embodiment 1 of the invention.

Details of transmission rate predicting section 108 will be described below with reference to FIG. 3. FIG. 3 is a block diagram illustrating a configuration of transmission rate predicting section 108.

Threshold determination section 301 compares the CQI input from transmission rate candidate selecting section 106 with a threshold, and when the CQI is higher than or equal to the threshold, outputs the input CQI to transmission rate averaging section 302, while making the CQI zero when the CQI is less than the threshold. This is because in HSDPA a radio communication apparatus with the high transmission rate is assigned as a radio communication apparatus to which packet data is transmitted by scheduling, and when the CQI is low, a possibility is considered that such a terminal is not assigned as a radio communication apparatus to which packet data is transmitted. In addition, it is possible to set any value as the threshold corresponding to the propagation environment, traffic amount or the like at that time.

Transmission rate averaging section 302 averages transmission rates corresponding to CQIs input from threshold determination section 301 for a constant time. This is because in HSDPA, the CQI is obtained at extremely short intervals (2 ms), and thus obtained CQI is largely affected by fading variations, whereby it is necessary to average corresponding transmission rates for a long time of some extent. A range of about 100 ms to is is appropriate as the time to average so as to decrease effects of fading to some extent. Transmission rate averaging section 302 averages CQIs to obtain a transmission rate prediction value, and outputs the value to offset adding section 303.

Offset adding section 303 beforehand stores an offset value that is a predetermined constant, multiplies the average CQI input from transmission rate averaging section 302 by the offset value to obtain a transmission rate prediction value, and outputs information of the obtained transmission rate prediction value to transmission rate prediction control section 110.

Figure 4:
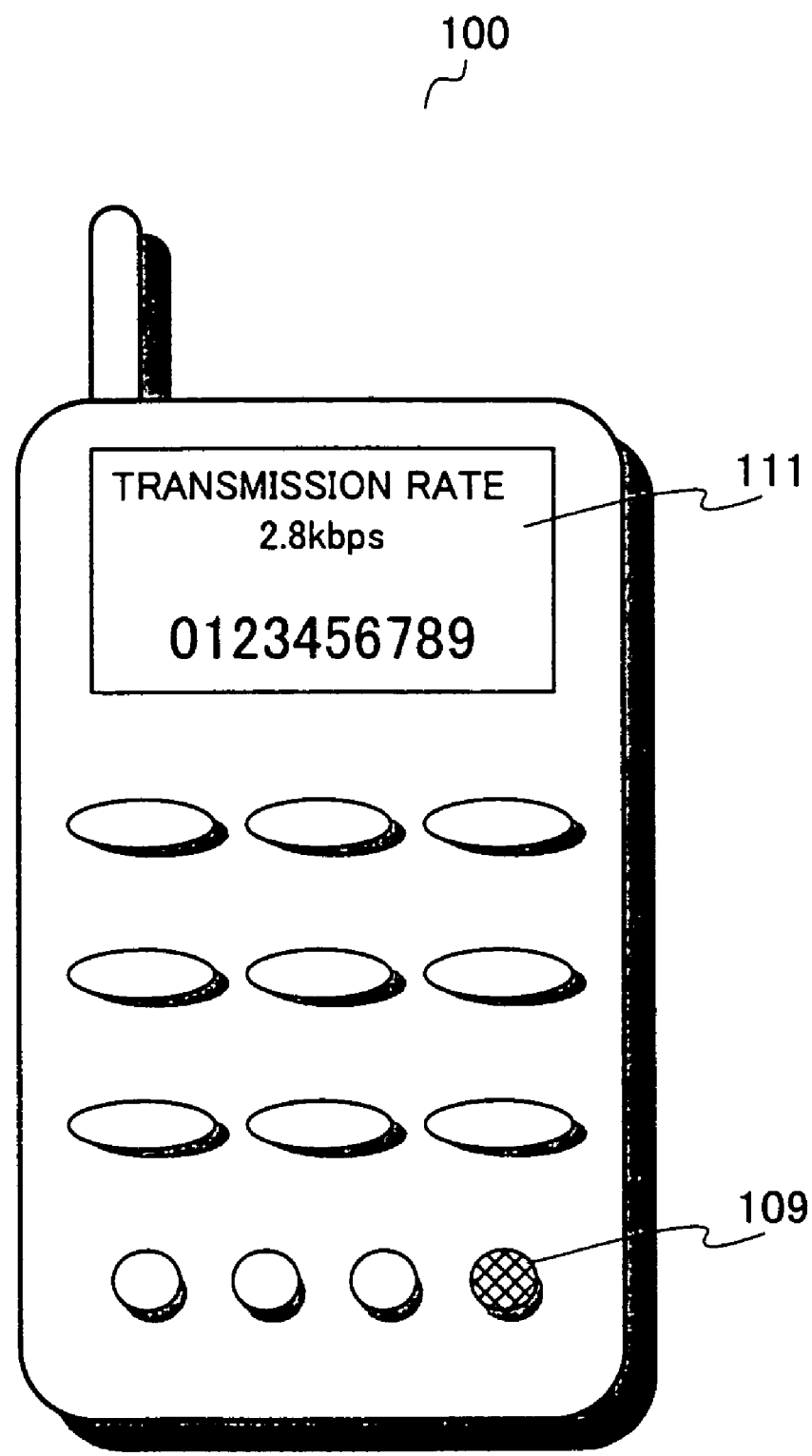
FIG. 4 is a view showing an appearance of the radio communication apparatus according to Embodiment 1 of the invention.

FIG. 4 shows a transmission rate prediction value displayed on display section 111 in radio communication apparatus 100. As shown in FIG. 4, by pressing key input determining section 109, the transmission rate prediction value such as "transmission rate 2.8 kbps" is displayed on display section 111, and the user is capable of seeing the transmission rate to directly recognize.

Thus, according to Embodiment 1, a transmission rate prediction value can be obtained before data transmission by averaging CQIs for a predetermined time, and it is thus possible to predict an accurate transmission rate before starting data communications, as compared with the conventional case of estimating a transmission rate using antenna marks. Further, according to Embodiment 1, the time required for download of data can be calculated using the obtained transmission rate prediction value, and a user is thereby capable of recognizing the time required for download before starting the download, thus enabling improvements in operability. Furthermore, according to Embodiment 1, since the transmission rate prediction value is obtained using the already-existing pilot channel, the need is eliminated of a new system to obtain a transmission rate prediction value, while it is only required on the reception side to add a circuit to predict a transmission rate to exiting HSDPA circuitry, and it is thus possible to prevent increases in circuit scale and entire apparatus.

In addition, in Embodiment 1 a transmission rate prediction value is displayed using a numerical value, but the invention is not limited to such a case. It may be possible to display a transmission rate prediction value using an expression method such as a color or mark other than the numerical value, notify a transmission rate prediction value by speech from a speaker, or notify a user of a transmission rate prediction value using an arbitrary method. Further, in Embodiment 1 the transmission rate prediction value is displayed on the display section of the radio communication apparatus, but the invention is not limited to such a case. It may be possible to display a transmission rate prediction value using any display section, for example, by connecting the radio communication apparatus to a personal computer to display the value on a screen of the personal computer.

Embodiment 2

Figure 5:
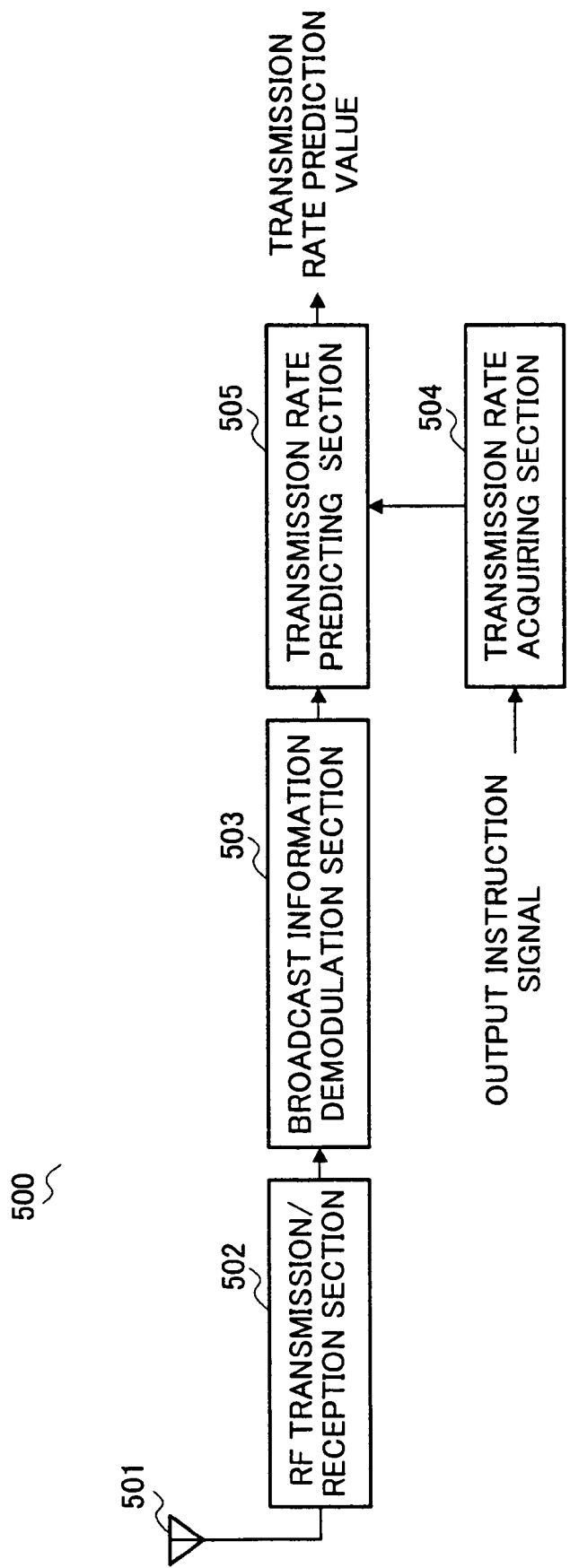
FIG. 5 is a block diagram illustrating a configuration of a radio communication apparatus according to Embodiment 2 of the invention.

FIG. 5 is a block diagram illustrating a configuration of radio communication apparatus 500 according to Embodiment 2 of the invention.

RF transmission/reception section 502 performs processing for downconverting a received signal received in antenna 501 from a radio frequency to a baseband frequency and the like, and outputs the resultant to broadcast information demodulation section 503.

Broadcast information demodulation section 503 demodulates the received signal input from RF transmission/reception section 502 to acquire broadcast information, and outputs the acquired broadcast information to transmission rate predicting section 505. The broadcast information transmitted from a base station not shown includes traffic information indicative of the traffic amount and the like. In this case, a plurality of radio communication apparatus performs communications by sharing communication resources using a shared channel. The traffic amount is represented by the average number of users actually using the shared channel, and the like. In addition, the traffic amount is not limited to the case of using the shared channel, and it may be possible to use a traffic amount of any channel that is a single channel used by a plurality of users.

Transmission rate acquiring section 504 is beforehand set for a plurality of transmission rates, and when receiving an output instruction signal, outputs a predetermined transmission rate to transmission rate predicting section 505.

Transmission rate predicting section 505 obtains a transmission rate prediction value based on information of the transmission rate input from transmission rate acquiring section 504 and on the broadcast information input from broadcast information demodulation section 503. In other words, transmission rate predicting section 505 divides the transmission rate prediction value by the number of users using the shared channel acquired from the broadcast information, thereby corrects the transmission rate input from transmission rate acquiring section 504, and is thus capable of obtaining a transmission rate prediction value. In addition, the invention is not limited to the case of dividing a transmission rate by the number of users to obtain a transmission rate prediction value, and it may be possible to obtain a transmission rate prediction value using the broadcast information of the number of users or the like by an arbitrary method.

Thus, according to Embodiment 2, in addition to advantages of Embodiment 1, a transmission rate prediction value is obtained using the broadcast information, and it is thereby possible to obtain a more accurate transmission rate prediction value.

In addition, in Embodiment 2 a transmission rate prediction value is displayed using a numerical value, but the invention is not limited to such a case. It may be possible to display a transmission rate prediction value using an expression method such as a color or mark other than the numerical value, notify a transmission rate prediction value by speech from a speaker, or notify a user of a transmission rate prediction value using an arbitrary method. Further, in Embodiment 2 the transmission rate prediction value is displayed on the display section of the radio communication apparatus, but the invention is not limited to such a case. It may be possible to display a transmission rate prediction value using any display section, for example, by connecting the radio communication apparatus to a personal computer to display the value on a screen of the personal computer.

Embodiment 3

Figure 6:
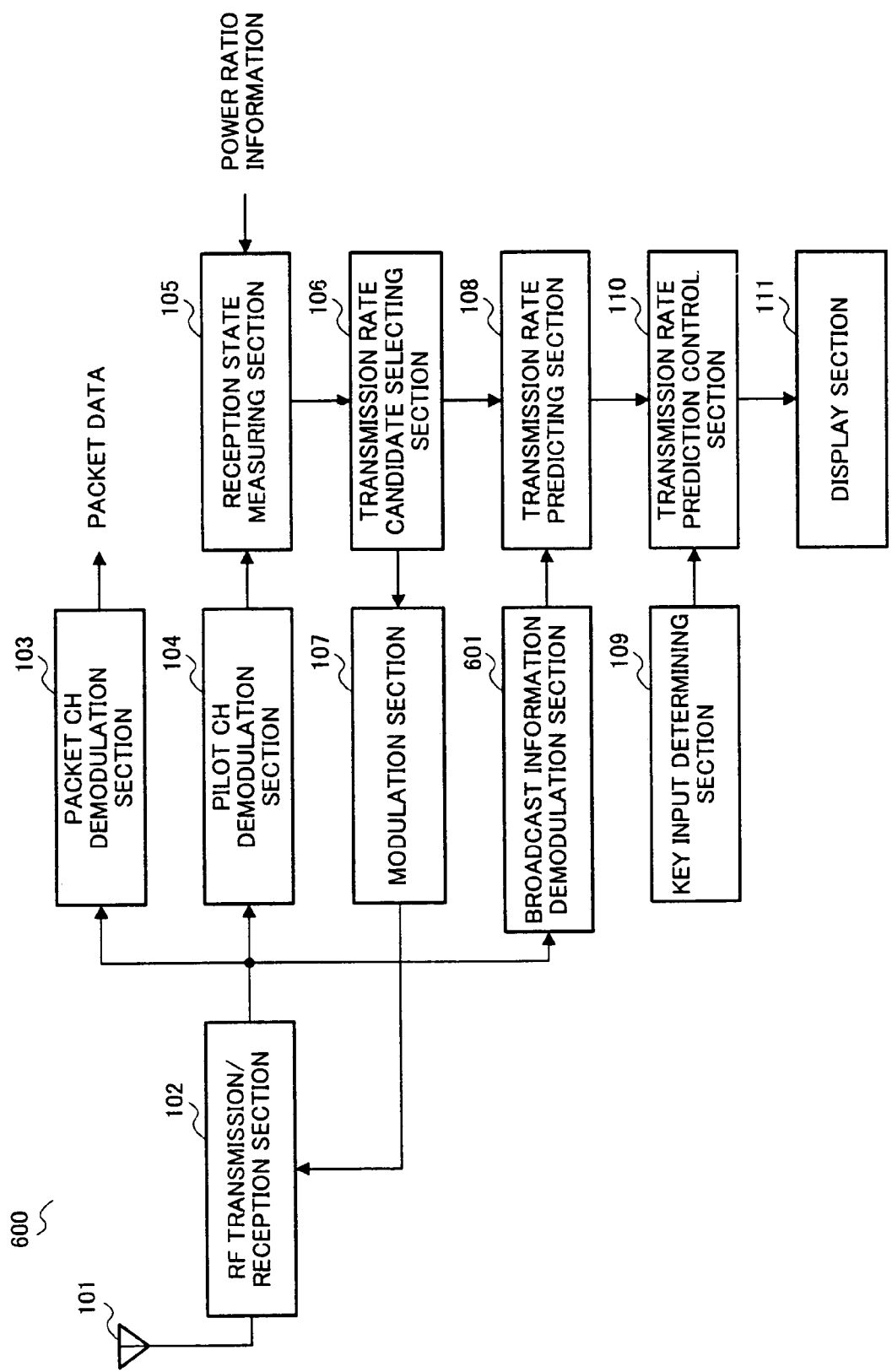
FIG. 6 is a block diagram illustrating a configuration of a radio communication apparatus according to Embodiment 3 of the invention.

FIG. 6 is a block diagram illustrating a configuration of radio communication apparatus 600 according to Embodiment 3 of the invention.

As shown in FIG. 6, radio communication apparatus 600 according to Embodiment 3 has the configuration of radio communication apparatus 100 according to Embodiment 1 as shown in FIG. 1 further provided with broadcast information demodulation section 601. In addition, in FIG. 6 the same sections as in FIG. 1 are assigned the same reference numerals to omit descriptions thereof.

Broadcast information demodulation section 601 demodulates a received signal input from RF transmission/reception section 102 to acquire broadcast information, and outputs the acquired broadcast information to transmission rate predicting section 108. The broadcast information transmitted from a base station not shown includes traffic information indicative of the traffic amount and the like. In this case, radio communication apparatus 600 communicates with the base station apparatus by sharing communication resources using a shared channel.

Figure 7:
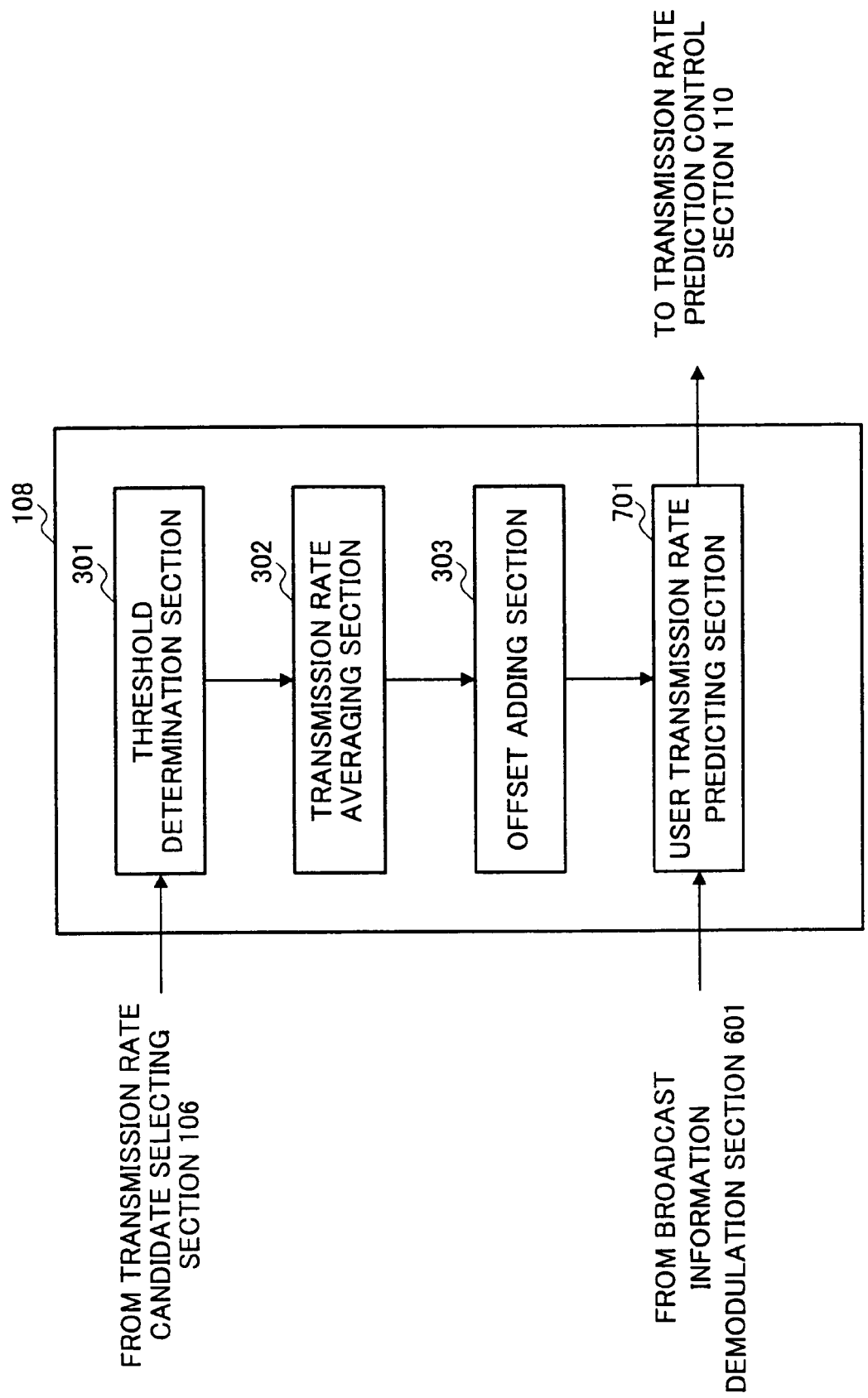
FIG. 7 is a block diagram illustrating a configuration of a transmission rate predicting section according to Embodiment 3 of the invention.

Details of transmission rate predicting section 108 will be described below with reference to FIG. 7. FIG. 7 is a block diagram illustrating a configuration of transmission rate predicting section 108.

As shown in FIG. 7, transmission rate predicting section 108 according to Embodiment 3 has the configuration of transmission rate predicting section 108 according to Embodiment 1 as shown in FIG. 3 further provided with user transmission rate predicting section 701. In addition, in FIG. 7 the same sections as in FIG. 3 are assigned the same reference numerals to omit descriptions thereof.

User transmission rate predicting section 701 obtains a transmission rate prediction value based on the transmission rate prediction value input from offset adding section 303 and on the broadcast information input from broadcast information demodulation section 601. In other words, user transmission rate predicting section 701 divides the transmission rate prediction value by the number of users using the shared channel acquired from the broadcast information, thereby corrects the transmission rate predicting value input from offset adding section 303 to obtain a final transmission rate prediction value, and outputs information of the obtained transmission rate prediction value to transmission rate prediction control section 110. In addition, the invention is not limited to the case of dividing a transmission rate by the number of users to obtain a transmission rate prediction value, and it maybe possible to obtain a transmission rate prediction value using the broadcast information of the number of users or the like by an arbitrary method.

Thus, according to Embodiment 3, in addition to advantages of Embodiment 1, a transmission rate prediction value is obtained using the broadcast information, and it is thereby possible to obtain a more accurate transmission rate prediction value.

In addition, in Embodiment 3 a transmission rate prediction value is displayed using a numerical value, but the invention is not limited to such a case. It may be possible to display a transmission rate prediction value using an expression method such as a color or mark other than the numerical value, notify a transmission rate prediction value by speech from a speaker, or notify a user of a transmission rate prediction value using an arbitrary method. Further, in Embodiment 3 the transmission rate prediction value is displayed on the display section of the radio communication apparatus, but the invention is not limited to such a case. It may be possible to display a transmission rate prediction value using any display section, for example, by connecting the radio communication apparatus to a personal computer to display the value on a screen of the personal computer.

Embodiment 4

Figure 8:
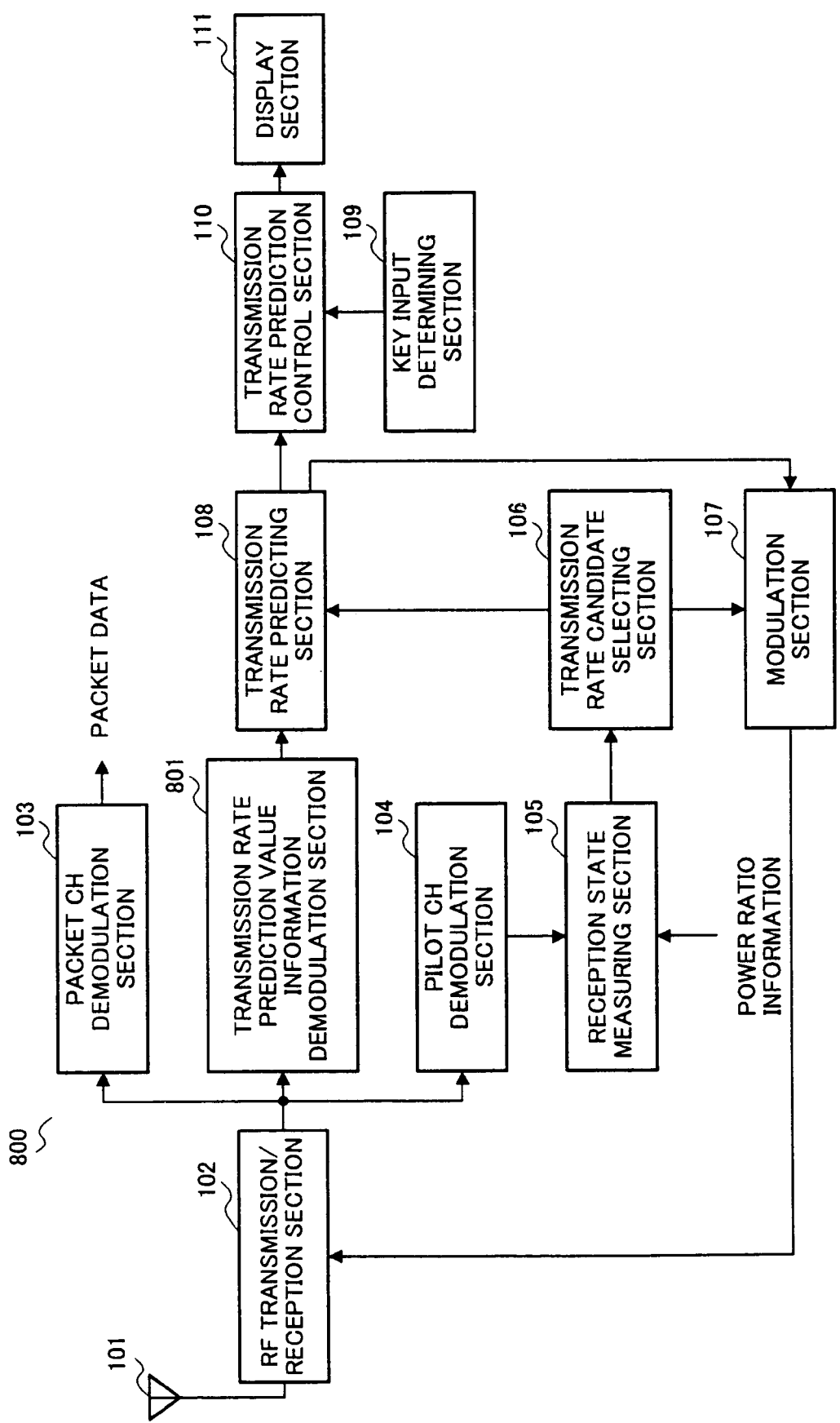
FIG. 8 is a block diagram illustrating a configuration of a radio communication apparatus according to Embodiment 4 of the invention.

FIG. 8 is a block diagram illustrating a configuration of radio communication apparatus 800 according to Embodiment 4 of the invention.

As shown in FIG. 8, radio communication apparatus 800 according to Embodiment 4 has the configuration of radio communication apparatus 100 according to Embodiment 1 as shown in FIG. 1 further provided with transmission rate prediction value information demodulation section 801. In addition, in FIG. 8 the same sections as in FIG. 1 are assigned the same reference numerals to omit descriptions thereof.

Transmission rate prediction value information demodulation section 801 that is the transmission rate prediction value information extractor demodulates a received signal input from RF transmission/reception section 102, and extracts transmission rate prediction value information that is transmission rate prediction value reception information to output to transmission rate predicting section 108.

Transmission rate predicting section 108 processes information of transmission rate candidate input from transmission rate candidate selecting section 106 using a threshold, averages the resultant to obtain a transmission rate prediction value, and further obtains a transmission rate ratio between the obtained transmission rate prediction value and the transmission rate prediction value information input from transmission rate prediction value information demodulation section 801. Then, transmission rate predicting section 108 multiplies the obtained transmission rate ratio by the transmission rate prediction value to correct the transmission rate prediction value, and outputs information of the corrected transmission rate prediction value to modulation section 107 and transmission rate prediction control section 110. Herein, the transmission rate prediction value subject to correction is obtained later than a transmission rate prediction value used in generating the transmission rate prediction value information extracted in transmission rate prediction value information demodulation section 801. In addition, transmission rate predicting section 108 will specifically be described later.

Modulation section 107 modulates a transmission signal including the information of transmission rate candidate input from transmission rate candidate selecting section 106 and transmission rate prediction value transmission information that is the information of transmission rate prediction value input from transmission rate predicting section 108, and outputs the resultant to RF transmission/reception section 102.

Figure 9:
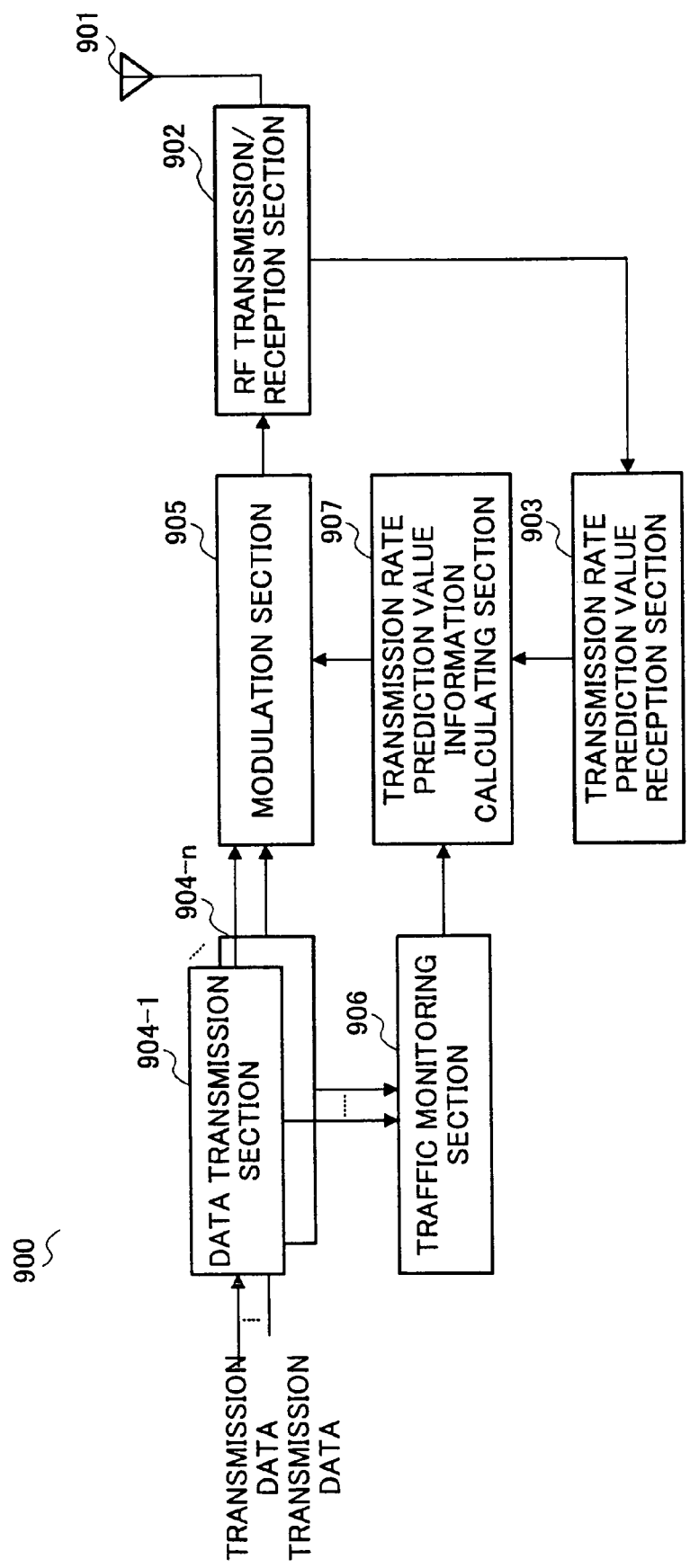
FIG. 9 is a block diagram illustrating a configuration of a base station apparatus according to Embodiment 4 of the invention.

A configuration of base station apparatus 900 will be described below with reference to FIG. 9. FIG. 9 is a block diagram illustrating the configuration of base station apparatus 900.

RF transmission/reception section 902 performs processing for downconverting a received signal received in antenna 901 from a radio frequency to a baseband frequency and the like, and outputs the resultant to transmission rate prediction value reception section 903.

Transmission rate prediction value reception section 903 extracts information of transmission rate prediction value included in the received signal to output to transmission rate prediction value information calculating section 907.

A same number of data transmission sections 904-1 to 904-$n$ are provided as the number of radio communication apparatuses of users allowed to communicate, and temporarily store transmission data to respective radio communication apparatuses in service to output to modulation section 905 at predetermined timing. Further, data transmission sections 904-1 to 904-$n$ output to traffic monitoring section 906 amounts of the transmission data to respective radio communication apparatuses in service and transmission data information of transmission data type and the like.

Modulation section 905 modulates a transmission signal including the transmission data input from data transmission sections 904-1 to 904-$n$ and the transmission rate prediction value information input from transmission rate prediction value information calculating section 907, and outputs the resultant to RF transmission/reception section 902.

Traffic monitoring section 906 measures a traffic amount from the transmission data information input from data transmission sections 904-1 to 904-$n$. The traffic amount may be the average number of users using a shared channel, or a value provided with more sophisticated traffic prediction, rate limitation information on the network side and the like. Traffic monitoring section 906 outputs traffic information that is information of the measured traffic amount to transmission rate prediction value information calculating section 907.

Transmission rate prediction value information calculating section 907 obtains a transmission rate prediction value based on the transmission rate prediction value information input from transmission rate prediction value reception section 903 and on the traffic information input from traffic monitoring section 906, and outputs transmission rate prediction value information that is information of the obtained transmission rate prediction value to modulation section 905. In other words, transmission rate prediction value information calculating section 907 divides the transmission rate prediction value by the number of users using the shared channel acquired from the broadcast information, thereby corrects the transmission rate prediction value input from transmission rate prediction value reception section 903, and is thus capable of obtaining a new transmission rate prediction value. In addition, the invention is not limited to the case of dividing a transmission rate prediction value by the number of users to obtain a transmission rate prediction value, and it may be possible to obtain a transmission rate prediction value using the broadcast information of the number of users or the like by an arbitrary method.

Figure 10:
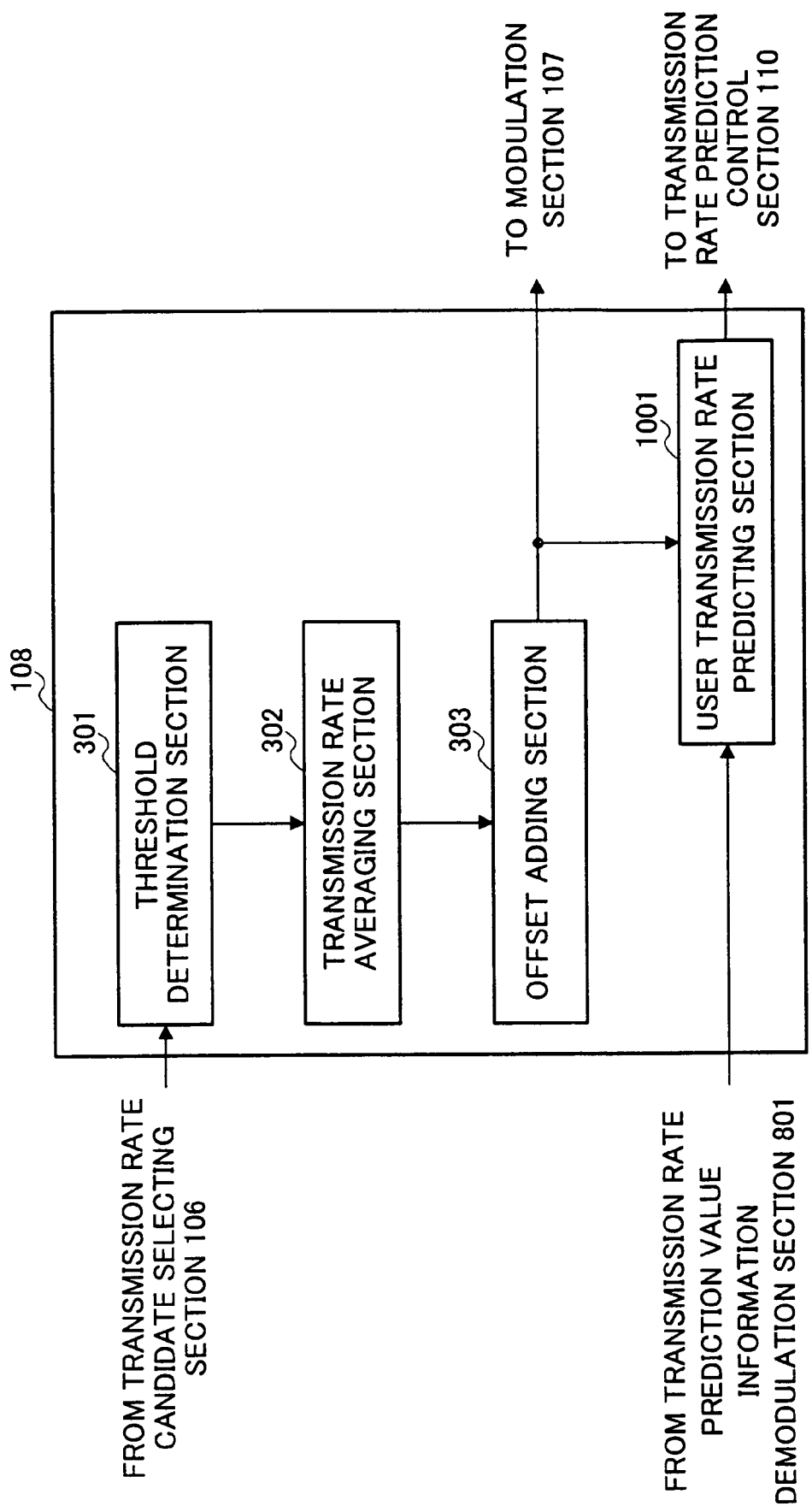
FIG. 10 is a block diagram illustrating a configuration of a transmission rate predicting section according to Embodiment 4 of the invention.

Details of transmission rate predicting section 108 will be described below with reference to FIG. 10. FIG. 10 is a block diagram illustrating a configuration of transmission rate predicting section 108.

As shown in FIG. 10, transmission rate predicting section 108 according to Embodiment 4 has the configuration of transmission rate predicting section 108 according to Embodiment 1 as shown in FIG. 3 further provided with user transmission rate predicting section 1001. In addition, in FIG. 10 the same sections as in FIG. 3 are assigned the same reference numerals to omit descriptions thereof.

Using the information of transmission rate prediction value input from transmission rate averaging section 302, offset adding section 303 multiplies a predicted value of transmission rate by a predetermined constant to obtain a final transmission rate prediction value, and outputs the obtained transmission rate prediction value to modulation section 107 and user transmission rate predicting section 1001.

User transmission rate predicting section 1001 obtains a final transmission rate prediction value based on the transmission rate prediction value input from offset adding section 303 and the transmission rate prediction value information input from transmission rate prediction value information demodulation section 801. In other words, user transmission rate predicting section 1001 obtains a transmission rate ratio between a transmission rate prediction value of the transmission rate prediction value information input from transmission rate prediction value information demodulation section 801 and the transmission rate prediction value of the transmission rate prediction value information input from offset adding section 303, multiplies the obtained transmission rate ratio by the transmission rate prediction value input from offset adding section 303, and thereby obtains a final transmission rate prediction value. Then, user transmission rate predicting section 1001 outputs information of the corrected transmission rate prediction value to transmission rate prediction control section 110.

The operation in radio communication apparatus 800 and base station apparatus 900 will be described below with reference to FIGS. 8 and 9.

First, in radio communication apparatus 800, pilot CH demodulation section 104 demodulates a pilot signal input from RF transmission/reception section 102 to output to reception state measuring section 105.

Reception state measuring section 105 measures an SIR indicative of the reception state using the pilot signal input from pilot CH demodulation section 104.

Transmission rate candidate selecting section 106 selects a transmission rate candidate using a measurement value of SIR.

Transmission rate predicting section 108 processes information of the transmission rate candidate using a threshold, averages the resultant to obtain a transmission rate prediction value, and stores the obtained transmission rate prediction value.

Modulation section 107 modulates a transmission signal including the information of the transmission rate candidate and information of the transmission rate prediction value, and the resultant signal is transmitted from antenna 101 through RF transmission/reception section 102.

In base station apparatus 900 having received the information of the transmission rate candidate and the information of the transmission rate prediction value, transmission rate prediction value reception section 903 extracts the information of the transmission rate prediction value included in a received signal.

Meanwhile, data transmission sections 904-1 to 904-*n* temporarily store transmission data to respective radio communication apparatuses in service to output at predetermined timing.

Traffic monitoring section 906 measures a traffic amount from transmission data information input from data transmission sections 904-1 to 904-*n*.

Transmission rate prediction value information calculating section 907 obtains a transmission rate prediction value based on the transmission rate prediction value information and traffic information.

Modulation section 905 modulates a transmission signal including the transmission data and transmission rate prediction value information, and the resultant signal is transmitted from antenna 901 through RF transmission/reception section 902.

In radio communication apparatus 800 having received the transmission data and transmission rate prediction value information, transmission rate prediction value information demodulation section 801 demodulates the received signal, and extracts the transmission rate prediction value information.

Meanwhile, pilot CH demodulation section 104 demodulates a pilot signal input from RF transmission/reception section 102.

Reception state measuring section 105 measures an SIR indicative of the reception state using the pilot signal.

Transmission rate candidate selecting section 106 selects a transmission rate candidate using a measurement value of the SIR, and outputs information of the selected transmission rate candidate to transmission rate predicting section 108 and modulation section 107.

Transmission rate predicting section 108 processes the information of the transmission rate candidate using a threshold, averages the resultant to obtain a transmission rate prediction value, and further obtains a transmission rate ratio by dividing the transmission rate prediction value that is corrected in base station apparatus 900 using the transmission rate prediction value information input from transmission rate prediction value information demodulation section 801 by a stored last-transmitted transmission rate prediction value.

Next, transmission rate predicting section 108 corrects the transmission rate prediction value by multiplying the calculated transmission rate ratio by the obtained transmission rate prediction value to obtain a final transmission rate prediction value, and displays the obtained transmission rate prediction value.

Thus, according to Embodiment 4, in addition to advantages of Embodiment 1 as described above, the transmission rate prediction value is obtained in consideration of the traffic amount, and it is thereby possible to obtain a transmission rate prediction value with high accuracy. Further, according to Embodiment 4, the base station apparatus obtains a transmission rate prediction value in consideration of the traffic amount, and the radio communication apparatus is capable of obtaining an accurate transmission rate prediction value only by making a correction corresponding to a difference between the information of transmission rate prediction value transmitted from the base station apparatus and a transmission rate prediction value measured by the radio communication apparatus, and thus obtaining the accurate transmission rate prediction value by simplified processing. Furthermore, according to Embodiment 4, the processing is simplified for obtaining the transmission rate prediction value, and it is thereby possible to miniaturize the circuit for obtaining the transmission rate prediction value.

In addition, in Embodiment 4 a transmission rate prediction value is displayed using a numerical value, but the invention is not limited to such a case. It may be possible to display a transmission rate prediction value using an expression method such as a color or mark other than the numerical value, notify a transmission rate prediction value by speech from a speaker, or notify a user of a transmission rate prediction value using an arbitrary method. Further, in Embodiment 4 the transmission rate prediction value is displayed on the display section of the radio communication apparatus, but the invention is not limited to such a case. It may be possible to display a transmission rate prediction value using any display section, for example, by connecting the radio communication apparatus to a personal computer to display the value on a screen of the personal computer.

Embodiment 5

Figure 11:
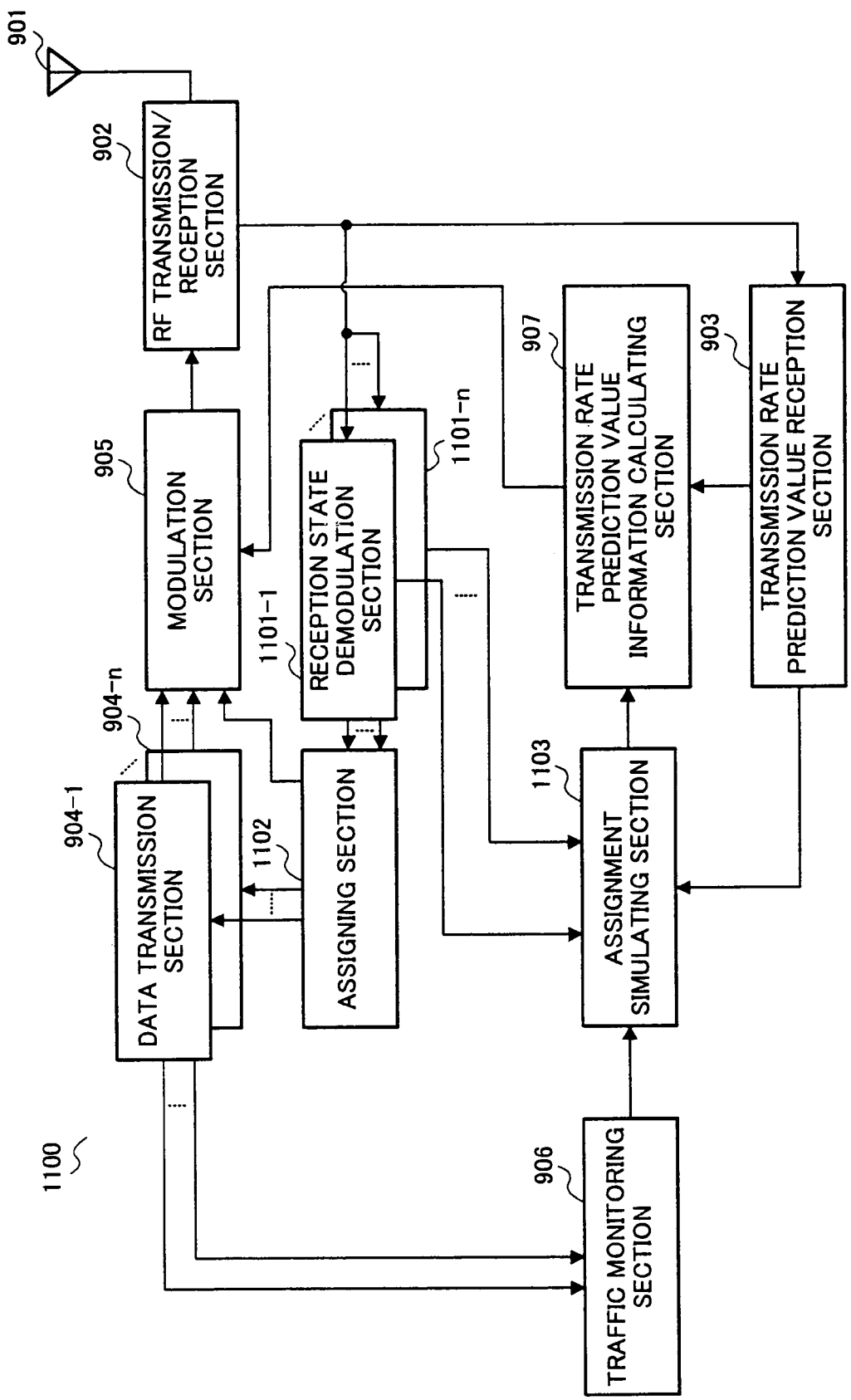
FIG. 11 is a block diagram illustrating a configuration of a base station apparatus according to Embodiment 5 of the invention.

FIG. 11 is a block diagram illustrating a configuration of base station apparatus 1100 according to Embodiment 5 of the invention.

As shown in FIG. 11, base station apparatus 1100 according to Embodiment 5 has the configuration of base station apparatus 900 according to Embodiment 4 as shown in FIG. 9 further provided with reception state demodulation sections 1101-1 to 1101-*n*, assigning section 1102 and assignment simulating section 1103. In addition, in FIG. 11 the same sections as in FIG. 9 are assigned the same reference numerals to omit descriptions thereof. A configuration of a radio communication apparatus is the same as the configuration in FIG. 8, and descriptions thereof are omitted.

Transmission rate prediction value reception section 903 that is the transmission rate prediction value information extractor extracts the information of transmission rate prediction value included in a received signal to output to transmission rate prediction value information calculating section 907. The information of transmission rate prediction value extracted in transmission rate prediction value reception section 903 has been transmitted from the radio communication apparatus before starting data communications.

Reception state demodulation sections 1101-1 to 1101-*n* demodulate and extract CQIs reported from radio communication apparatuses from received signals input from RF transmission/reception section 902, respectively, and output extracted CQIs to assigning section 1102 and assignment simulating section 1103.

Assigning section 1102 has a reference table storing scheduling information that associates the CQI with modulation scheme information and the like as shown in FIG. 12, and determines a modulation scheme, coding rate and the like using the CQI input from each of reception state demodulation sections 1101-1 to 1101-*n*. Further, assigning section 1102 performs scheduling that is processing for selecting a radio communication apparatus to transmit packet data. Then, assigning section 1102 instructs modulation section 905 to perform adaptive modulation using the determined modulation scheme, while controlling some of data transmission sections 904-1 to 904-*n* which store packet data to transmit to radio communication apparatuses assigned by scheduling so that the packet data is output.

Assignment simulating section 1103 that is the terminal assignment simulator has the reference table storing scheduling information that associates the CQI with modulation scheme information and the like as shown in FIG. 12, and determines a modulation scheme, coding rate and the like using the CQI input from each of reception state demodulation sections 1101-1 to 1101-*n*. Further, from the CQIs input from reception state demodulation sections 1101-1 to 1101-*n* and the traffic information input from traffic monitoring section 906, assignment simulating section 1103 performs scheduling that is the processing for selecting a radio communication apparatus to transmit packet data, and obtains assignment frequencies to assign packet data to be accommodated in predetermined resources to all radio communication apparatuses including radio communication apparatuses before starting data communications and radio communication apparatuses during data communications. Assignment simulating section 1103 receives the CQI of each radio communication apparatus currently performing data transmission, and is thus capable of predicting a frequency to assign packet data to each radio communication apparatus. Then, assignment simulating section 1103 outputs information of the assignment frequency to assign packet data to transmission rate prediction value information calculating section 907.

Transmission rate prediction value information calculating section 907 obtains a transmission rate prediction value based on the transmission rate prediction value information input from transmission rate prediction value reception section 903 and on the information of the assignment frequency to assign packet data input from assignment simulating section 1103, and outputs transmission rate prediction value information that is information of the obtained transmission rate prediction value to modulation section 905. In other words, transmission rate prediction value information calculating section 907 multiplies the transmission rate prediction value by the assignment frequency using the information of the transmission rate prediction value transmitted from the radio communication apparatus.

The operation in radio communication apparatus 800 and base station apparatus 1100 will be described below with reference to FIGS. 8 and 11.

First, in radio communication apparatus 800, pilot CH demodulation section 104 demodulates a pilot signal input from RF transmission/reception section 102 to output to reception state measuring section 105.

Reception state measuring section 105 measures an SIR indicative of the reception state using the pilot signal input from pilot CH demodulation section 104.

Transmission rate candidate selecting section 106 selects a transmission rate candidate using a measurement value of the SIR.

Transmission rate predicting section 108 processes information of the transmission rate candidate using a threshold, averages the resultant, and thus obtains a transmission rate prediction value.

Modulation section 107 modulates a transmission signal including the information of the transmission rate candidate and information of the transmission rate prediction value, and the resultant signal is transmitted from antenna 101 through RF transmission/reception section 102.

In base station apparatus 1100 having received the information of the transmission rate candidate and the information of the transmission rate prediction value, transmission rate prediction value reception section 903 extracts the information of the transmission rate prediction value included in a received signal.

Meanwhile, data transmission sections 904-1 to 904-*n* temporarily store transmission data to respective radio communication apparatuses in service to output at predetermined timing.

Traffic monitoring section 906 measures a traffic amount from transmission data information input from data transmission sections 904-1 to 904-*n*.

Transmission rate prediction value information calculating section 907 obtains a transmission rate prediction value based on the transmission rate prediction value information and traffic information.

Modulation section 905 modulates a transmission signal including the transmission data and transmission rate prediction value information, and the resultant signal is transmitted from antenna 901 through RF transmission/reception section 902.

In radio communication apparatus 800 having received the transmission data and transmission rate prediction value information, transmission rate prediction value reception section 903 extracts the information of the transmission rate prediction value included in the received signal.

Assignment simulating section 1103 determines a modulation scheme, coding rate and the like using the CQI, while performing scheduling that is the processing for selecting a radio communication apparatus to transmit packet data from the CQI and traffic information.

Next, assignment simulating section 1103 obtains an assignment frequency to assign packet data.

Transmission rate prediction value information calculating section 907 obtains a transmission rate prediction value based on the transmission rate prediction value information and information of the assignment frequency to assign packet data.

Modulation section 905 modulates a transmission signal including the transmission data and information of the transmission rate prediction value, and the resultant signal is transmitted from antenna 901 through RF transmission/reception section 902.

In radio communication apparatus 800 having received the transmission data and the transmission rate prediction value information, transmission rate prediction value information demodulation section 801 demodulates the received signal, and extracts the transmission rate prediction value information.

Meanwhile, pilot CH demodulation section 104 demodulates a pilot signal input from RF transmission/reception section 102.

Reception state measuring section 105 measures an SIR indicative of the reception state using the pilot signal.

Transmission rate candidate selecting section 106 selects a transmission rate candidate using a measurement value of the SIR.

Transmission rate predicting section 108 processes information of the transmission rate candidate using a threshold, averages the resultant to obtain a transmission rate prediction value, and corrects the transmission rate prediction value based on the obtained transmission rate prediction value and the transmission rate prediction value information input from transmission rate prediction value information demodulation section 801.

Next, transmission rate predicting section 108 displays the obtained transmission rate prediction value Thus, according to Embodiment 5, in addition to advantages of Embodiment 1 as described above, scheduling is carried out using SIRs of all radio communication apparatuses including radio communication apparatuses in data communications to obtain assignment frequencies to assign packet data, the transmission rate prediction value is obtained in consideration of the obtained assignment frequencies, and it is thereby possible to obtain a transmission rate prediction value with high accuracy. Further, according to Embodiment 5, the base station apparatus performs scheduling and obtains a transmission rate prediction value in consideration of assignment frequencies to assign packet data, and the radio communication apparatus is capable of obtaining an accurate transmission rate prediction value only by making a correction based on the information of the transmission rate prediction value transmitted from the base station apparatus and a transmission rate prediction value measured by the radio communication apparatus, and thus obtaining the accurate transmission rate prediction value by simplified processing. Furthermore, according to Embodiment 5, the processing is simplified for obtaining the transmission rate prediction value, and it is thereby possible to miniaturize the circuit for obtaining the transmission rate prediction value.

In addition, in Embodiment 5 a transmission rate prediction value is displayed using a numerical value, but the invention is not limited to such a case. It may be possible to display a transmission rate prediction value using an expression method such as a color or mark other than the numerical value, notify a transmission rate prediction value by speech from a speaker, or notify a user of a transmission rate prediction value using an arbitrary method. Further, in Embodiment 5 the transmission rate prediction value is displayed on the display section of the radio communication apparatus, but the invention is not limited to such a case. It may be possible to display a transmission rate prediction value using any display section, for example, by connecting the radio communication apparatus to a personal computer to display the value on a screen of the personal computer.

Embodiment 6

Figure 13:
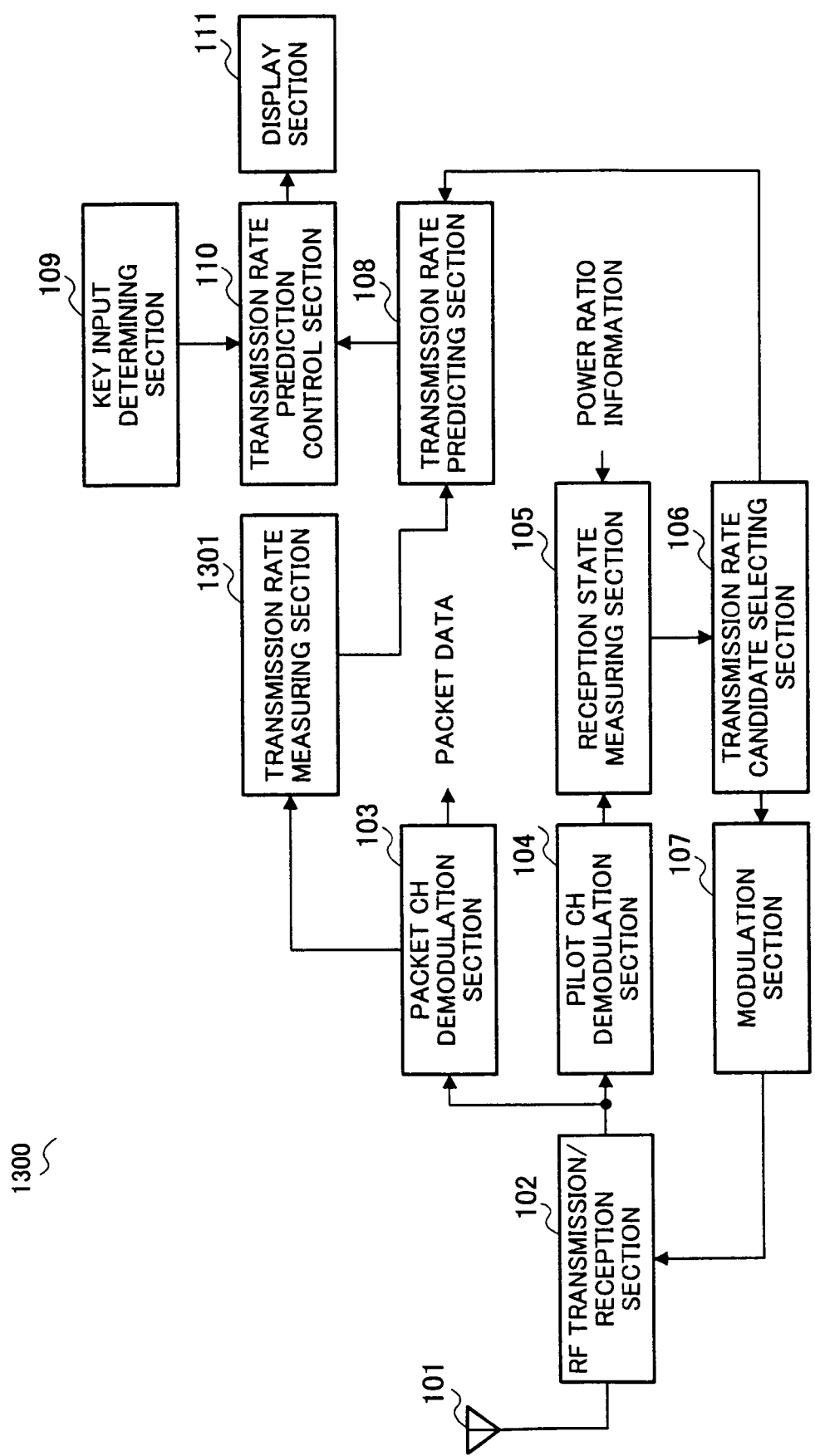
FIG. 13 is a block diagram illustrating a configuration of a radio communication apparatus according to Embodiment 6 of the invention.

FIG. 13 is a block diagram illustrating a configuration of radio communication apparatus 1300 according to Embodiment 6 of the invention.

As shown in FIG. 13, radio communication apparatus 1300 according to Embodiment 6 has the configuration of radio communication apparatus 100 according to Embodiment 1 as shown in FIG. 1 further provided with transmission rate measuring section 1301. In addition, in FIG. 13 the same sections as in FIG. 1 are assigned the same reference numerals to omit descriptions thereof.

Transmission rate measuring section 1301 measures a transmission rate of packet data that has actually been transmitted, and outputs the measurement to transmission rate predicting section 108. The transmission rate actual measurement value measured in transmission rate measuring section 1301 indicates a transmission rate during data communications, and can be obtained from a data amount of actually transmitted packet data.

Transmission rate predicting section 108 processes the CQI input from transmission rate candidate selecting section 106 using a threshold, averages the resultant to obtain a transmission rate prediction value, and further obtains a transmission rate ratio between the obtained transmission rate prediction value and information of the transmission rate actual measurement value input from transmission rate measuring section 1301. Then, based on the obtained transmission rate ratio, transmission rate predicting section 108 corrects the transmission rate prediction value input from transmission rate candidate selecting section 106, and outputs the corrected transmission rate prediction value to transmission rate prediction control section 110.

Figure 14:
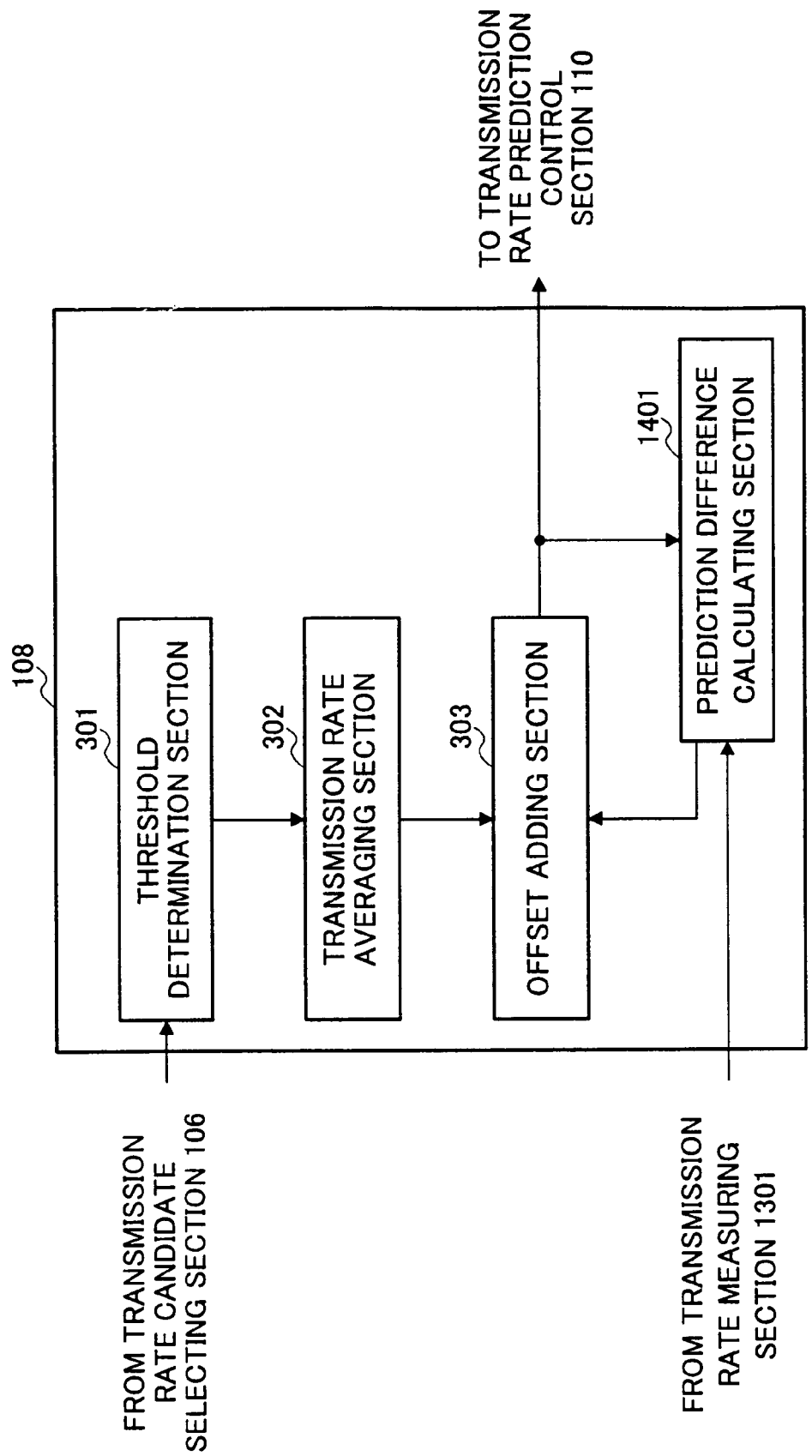
FIG. 14 is a block diagram illustrating a configuration of a transmission rate predicting section according to Embodiment 6 of the invention.

Transmission rate predicting section 108 will specifically be described below with reference to FIG. 14. FIG. 14 is a block diagram illustrating a configuration of transmission rate predicting section 108.

Transmission rate predicting section 108 according to Embodiment 6 has the configuration of transmission rate predicting section 108 according to Embodiment 1 as shown in FIG. 3 further provided with prediction difference calculating section 1401. In addition, in FIG. 14 the same sections as in FIG. 3 are assigned the same reference numerals to omit descriptions thereof.

Offset adding section 303 multiplies a beforehand stored offset value by the transmission rate ratio using information of the transmission rate ratio between the transmission rate prediction value and transmission rate actual measurement value input from prediction difference calculating section 1401, and thereby sets a new offset value. Then, offset adding section 303 multiplies the average CQI input from transmission rate averaging section 302 by the offset value to correct the transmission rate prediction value, and outputs information of the corrected transmission rate prediction value to transmission rate prediction control section 110.

Prediction difference calculating section 1401 obtains the transmission rate ratio between the transmission rate prediction value and transmission rate actual measurement value from the information of the transmission rate prediction value input from offset adding section 303 and the information of the transmission rate actual measurement value input from transmission rate measuring section 1301, and outputs information of the obtained transmission rate ratio to offset adding section 303.

Thus, according to Embodiment 6, in addition to advantages of Embodiment 1, an offset value is corrected using a transmission rate during data communications, and thus the offset value for use in obtaining a subsequent transmission rate prediction value is corrected sequentially, whereby it is possible to obtain a transmission rate prediction value with high accuracy.

In addition, in Embodiment 6 a transmission rate prediction value is displayed using a numerical value, but the invention is not limited to such a case. It may be possible to display a transmission rate prediction value using an expression method such as a color or mark other than the numerical value, notify a transmission rate prediction value by speech from a speaker, or notify a user of a transmission rate prediction value using an arbitrary method. Further, in Embodiment 6 the transmission rate prediction value is displayed on the display section of the radio communication apparatus, but the invention is not limited to such a case. It may be possible to display a transmission rate prediction value using any display section, for example, by connecting the radio communication apparatus to a personal computer to display the value on a screen of the personal computer.

Embodiment 7

Figure 15:
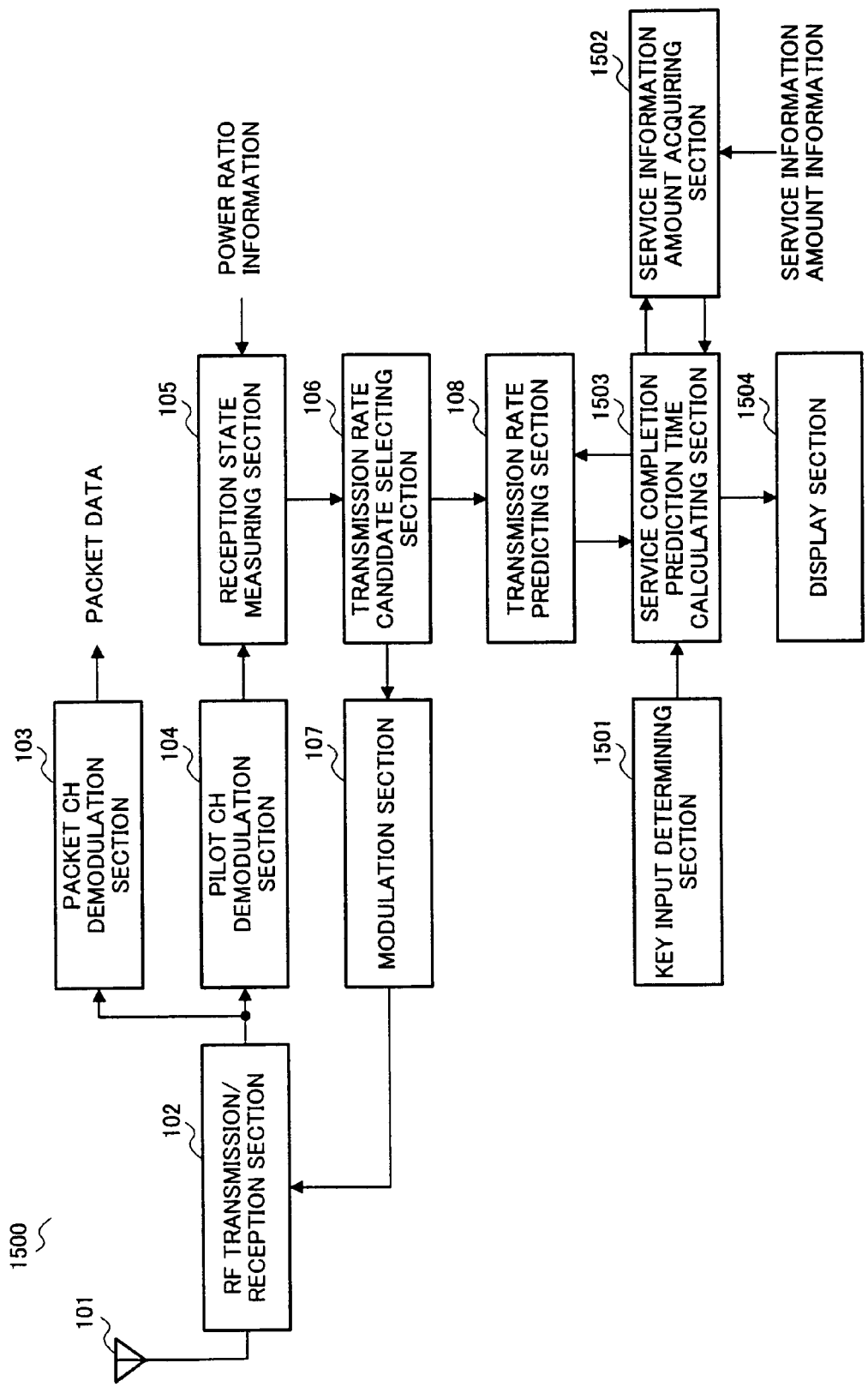
FIG. 15 is a block diagram illustrating a configuration of a radio communication apparatus according to Embodiment 7 of the invention.

FIG. 15 is a block diagram illustrating a configuration of radio communication apparatus 1500 according to Embodiment 7 of the invention.

As shown in FIG. 15, radio communication apparatus 1500 according to Embodiment 7 of the invention has the configuration of radio communication apparatus 100 according to Embodiment 1 as shown in FIG. 1 further provided with key input determining section 1501, service information amount acquiring section 1502, service completion prediction time calculating section 1503 and display section 1504. In addition, in FIG. 15 the same sections as in FIG. 1 are assigned the same reference numerals to omit descriptions thereof.

Key input determining section 1501 detects whether a key is input by a user to express the user's intention to receive a service and whether another key is input by the user to designate desired data acquisition completion time in receiving the desired service, and when detecting an input of such a key, outputs a signal indicating that the key is input to service completion prediction time calculating section 1503.

Service information amount acquiring section 1502 beforehand stores information amounts of all services that can be offered to users, and when service completion prediction time calculating section 1503 reads information of service information amount, outputs information of an information amount of each service to service completion prediction time calculating section 1503. Further, service information amount acquiring section 1502 acquires information amounts of data with different levels of quality on each service.

When receiving a signal indicating that the key is input from key input determining section 1501, service completion prediction time calculating section 1503 that is the data reception time calculator reads out the information of transmission rate prediction value from transmission rate predicting section 108, while reading out information of the information amounts of each service from service information amount acquiring section 1502. Then, service completion prediction time calculating section 1503 divides the information amount of each service by the transmission rate prediction value, thereby calculates reception time that is the time between starting and finishing reception of data, and determines whether or not acquisition of the data is finished until the user desired data acquisition completion time input from key input determining section 1501. When acquisition of the data is not completed until the user desired time, service completion prediction time calculating section 1503 does not store the service, while storing the service when acquisition of the data is completed until the user desired time. After finishing calculation of times data acquisition is completed for all the services, service completion prediction time calculating section 1503 outputs to display section 1504 data type information of the service stored as the service of which data acquisition is completed until the user desired time, and reception time information such as the time (prediction time) required for reception of the data of the stored service, the time reception of the data of the stored service is finished, or the like. At this point, for example, when the user desires acquisition of image data, service completion prediction time calculating section 1503 selects data with quality enabling its acquisition to be finished until the user desired data acquisition completion time from among items of data with different levels of quality of the same image.

Display section 1504 displays the data type information and reception time information input from service completion prediction time calculating section 1503 on the display such as a liquid crystal screen.

Figure 16:
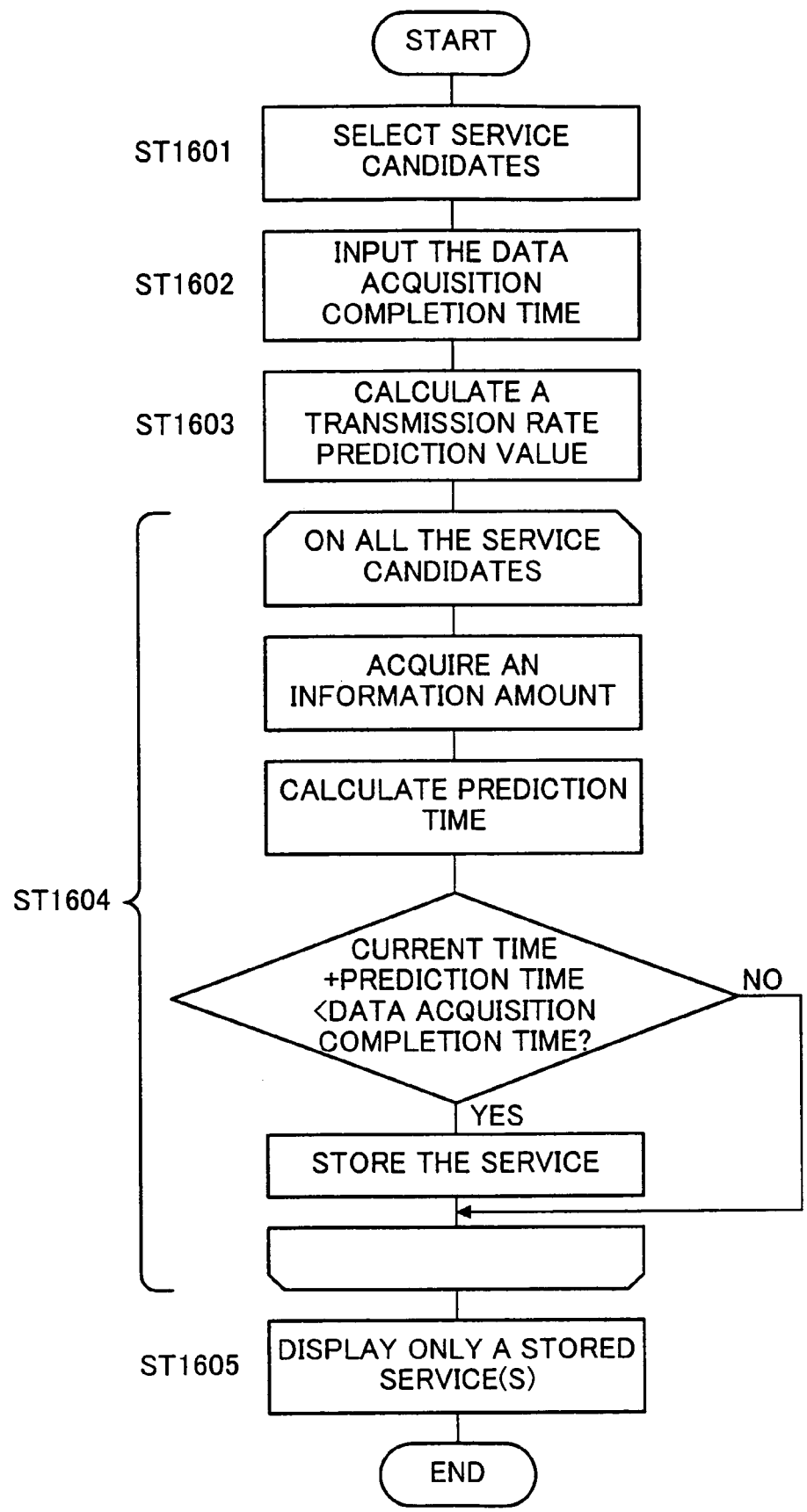
FIG. 16 is a flow diagram illustrating operation of the radio communication apparatus according to Embodiment 7 of the invention.

The operation of radio communication apparatus 1500 will be described below with reference to FIG. 16. FIG. 16 is a flow diagram of the operation of radio communication apparatus 1500.

First, a user presses a predetermined key of radio communication apparatus 1500 and thereby selects service candidates, and key input determining section 1501 outputs information of the user selected services to service completion prediction time calculating section 1503 (step ST1601).

The user next presses a predetermined key of radio communication apparatus 1500 to input the data acquisition completion time that the user desires in receiving a selected service, and key input determining section 1501 outputs information of the user desired data acquisition completion time to service completion prediction time calculating section 1503 (step ST1602).

Reception state measuring section 105 measures an SIR from a received signal, transmission rate candidate selecting section 106 selects the CQI from the measured SIR, and transmission rate predicting section 108 averages the selected CQI for a predetermined time and thereby calculates a transmission rate prediction value (step ST1603).

Service completion predicting time calculating section 1503 acquires an information amount of the user selected service and the transmission rate prediction value information, and calculates prediction time. Then, service completion predicting time calculating section 1503 determines whether or not a result of the sum of the current time and the calculated prediction time is smaller than the data acquisition completion time (threshold) (whether or not data acquisition is completed until the data acquisition completion time). When the result of the sum of the current time and the calculated prediction time is smaller than the data acquisition completion time, service completion prediction time calculating section 1503 stores the service. Meanwhile, when the result of the sum of the current time and the calculated prediction time is not smaller than the data acquisition completion time, the section 1503 does not store the service. Service completion prediction time calculating section 1503 executes such processing for all the services that the user has selected (step ST1604).

Next, service completion prediction time calculating section 1503 displays an only stored service(s) on display section 1504 (step ST1605).

Figure 17:
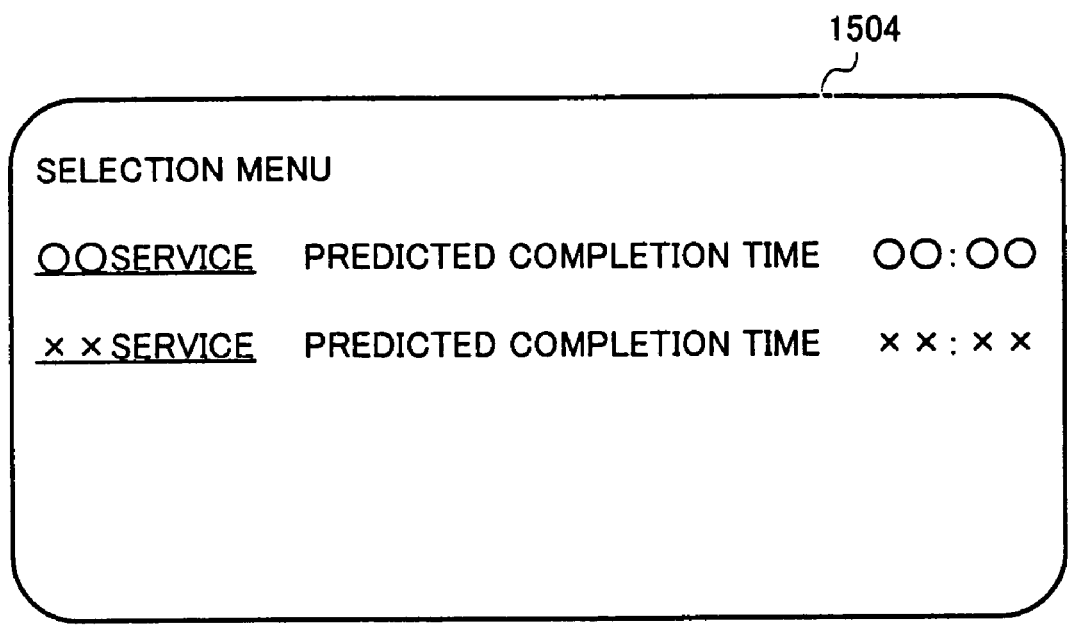
FIG. 17 is a view showing display on a display section according to Embodiment 7 of the invention.

FIG. 17 shows display section 1504 displaying services enabling their data acquisition to be completed until the user desired data acquisition completion time and predicted completion times. The user is capable of selecting a desired service from among a plurality of services displayed as shown in FIG. 17.

Thus, according to Embodiment 7, in addition to advantages of Embodiment 1, a user inputs desired services and desired data acquisition completion time into the radio communication apparatus, the apparatus displays a list of services enabling their data acquisition to be completed until the desired data acquisition completion time, and the user is thereby capable of selecting a desired service while viewing the data acquisition completion times. It is thus possible to provide the radio communication apparatus with extremely high operability.

In addition, subjects displayed in Embodiment 7 are only services satisfying the user desired data acquisition completion time, but the invention is not limited to such a case. It may be possible to display all services that a user selects and data acquisition completion times of all the services. Further, in Embodiment 7 a data type and reception time information is displayed using text and numerical value, but the invention is not limited to such a case. It may be possible to display the data type and reception time information using an expression method such as a color or mark other than text and numerical value, notify the data type and reception time information by speech from a speaker, or notify a user of the data type and reception time information using an arbitrary method. Furthermore, in Embodiment 7 the data type and reception time information is displayed on the display section of the radio communication apparatus, but the invention is not limited to such a case. It may be possible to display a data type and reception time information using any display section, for example, by connecting the radio communication apparatus to a personal computer to display the data type and reception time information on a screen of the personal computer.

In above-mentioned Embodiments 1 to 7, the CQI is used as a transmission rate and transmission rate prediction value, but the invention is not limited to such a case. It may be possible to use any information indicative of a transmission rate such as MCS. Further, in above-mentioned Embodiments 1 to 7 the CQI is obtained by calculation expression, but the invention is not limited to such a case. It may be possible to store a reference table which stores CQI selection information that associates a measurement value indicative of reception quality such as the SIR with the CQI, and select the CQI using the measured SIR. Furthermore, the radio communication apparatus of any one of above-mentioned Embodiments 1 to 7 is applicable to a communication terminal apparatus.

This application is based on the Japanese Patent Application No. 2003-390767 filed on Nov. 20, 2003, entire content of which is expressly incorporated by reference herein.

INDUSTRIAL APPLICABILITY

The present invention is suitable for use in a radio communication apparatus, base station apparatus and communication terminal apparatus that predict a transmission rate.

The invention claimed is:

1. A radio communication apparatus comprising:
a reception quality measurer that calculates a measurement value indicative of reception quality from a reception quality measurement signal received before starting communications of packet data;
a transmission rate selector that selects a transmission rate of the packet data based on the measurement value measured in the reception quality measurer;
a transmission rate predictor that obtains a transmission rate prediction value from an average transmission rate obtained by averaging the transmission rate selected in the transmission rate selector for a predetermined time;
a data reception time calculator that obtains reception time between starting and finishing reception of data for each of data types from an information amount of each of a plurality of receivable data types and the transmission rate prediction value obtained in the transmission rate predictor; and
a display that displays reception time information, which is information indicative of the reception time obtained in the data reception time calculator, for each of data types.

2. The radio communication apparatus according to claim 1, wherein the data type information indicative of a data type is displayed such that the reception time is less than a predetermined threshold, for each of data types.

3. The radio communication apparatus according to claim 1, further comprising:
a broadcast information demodulator that extracts traffic information indicative of a traffic amount from a received signal,
wherein the transmission rate predictor obtains the transmission rate prediction value based on the traffic information extracted in the broadcast information demodulator and on the average transmission rate.

4. The radio communication apparatus according to claim 3, wherein the transmission rate predictor obtains the transmission rate prediction value by dividing the average transmission rate by the number of users performing communications using a same channel, the number being of the traffic amount.

5. The radio communication apparatus according to claim 1, further comprising:
a transmitter that transmits transmission rate prediction value transmission information that is information of the transmission rate prediction value obtained in the transmission rate predictor; and
a transmission rate prediction value information extractor that extracts from a received signal transmission rate prediction value reception information that is information of a transmission rate prediction value obtained in a communicating party based on the transmission rate prediction value transmission information transmitted in the transmitter and on the traffic information,
wherein the transmission rate predictor corrects a transmission rate prediction value newly obtained based on the transmission rate prediction value newly obtained after the transmission rate prediction value of the transmission rate prediction value transmission information and on the transmission rate prediction value reception information.

6. The radio communication apparatus according to claim 5, wherein the transmission rate predictor corrects the transmission rate prediction value newly obtained by obtaining a transmission rate ratio between the transmission rate prediction value of the transmission rate prediction value reception information and the transmission rate prediction value transmitted from the transmitter as the transmission rate prediction value transmission information, and multiplying the transmission rate prediction value newly obtained by the transmission rate ratio.

7. The radio communication apparatus according to claim 1, further comprising:
a transmission rate actual measurer that obtains a transmission rate actual measurement value of packet data by averaging a transmission rate of the packet data for a predetermined time during communications of the packet data, wherein the transmission rate predictor corrects the transmission rate prediction value based on the transmission rate prediction value and the transmission rate actual measurement value.

8. The radio communication apparatus according to claim 7, wherein the transmission rate predictor obtains the transmission rate prediction value by multiplying the average transmission rate by an offset value, further obtains a transmission rate ratio between the transmission rate prediction value and the transmission rate actual measurement value, and corrects the offset value by multiplying the transmission rate ratio by the offset value.

9. A transmission rate predicting method comprising the steps of:

calculating a measurement value indicative of reception quality from a reception quality measurement signal received before starting communications of packet data;

selecting a transmission rate of the packet data based on the measurement value;

obtaining a transmission rate prediction value from an average transmission rate obtained by averaging the selected transmission rate for a predetermined times;

obtaining reception time between starting and finishing reception of data for each of data types from an information amount of each of a plurality of receivable data types and the transmission rate prediction value; and displaying reception time information, which is information indicative of the reception time, for each of data types.

10. A transmission rate predicting method according to claim 9, wherein the data type information indicative of a data type is displayed such that the reception time is less than a predetermined threshold, for each of data types.

* * * * *